(12) United States Patent
Tin et al.

(10) Patent No.: US 9,958,259 B2
(45) Date of Patent: May 1, 2018

(54) DEPTH VALUE MEASUREMENT

(71) Applicant: CANON KABUSHIKI KAISHA, Tokyo (JP)

(72) Inventors: Siu-Kei Tin, Milpitas, CA (US); Jinwei Ye, San Jose, CA (US)

(73) Assignee: CANON KABUSHIKI KAISHA, Tokyo (JP)

( * ) Notice: Subject to any disclaimer, the term of this patent is extended or adjusted under 35 U.S.C. 154(b) by 312 days.

(21) Appl. No.: 14/993,350

(22) Filed: Jan. 12, 2016

(65) Prior Publication Data
US 2017/0199028 A1    Jul. 13, 2017

(51) Int. Cl.
| | |
|---|---|
| *G01B 11/22* | (2006.01) |
| *G06T 7/60* | (2017.01) |
| *G06T 7/00* | (2017.01) |
| *H04N 5/225* | (2006.01) |
| *H04N 5/247* | (2006.01) |
| *G01B 11/25* | (2006.01) |
| *G06K 7/10* | (2006.01) |

(52) U.S. Cl.
CPC ............ *G01B 11/22* (2013.01); *G01B 11/25* (2013.01); *G06K 7/10732* (2013.01); *G06T 7/0051* (2013.01); *G06T 7/60* (2013.01); *H04N 5/2256* (2013.01); *H04N 5/247* (2013.01)

(58) Field of Classification Search
CPC .... G01B 11/22; G01B 11/25; G06K 7/10732; H04N 5/247; H04N 5/2256; G06T 7/0051; G06T 7/60
See application file for complete search history.

(56) References Cited

U.S. PATENT DOCUMENTS

| | | |
|---|---|---|
| 7,492,450 B2 | 2/2009 | Harding et al. |
| 7,492,497 B2 | 2/2009 | Paolini, Jr. et al. |
| 7,711,182 B2 | 5/2010 | Beardsley |
| 8,004,747 B2 | 8/2011 | Frazier |
| 8,064,069 B2 | 11/2011 | Wienand et al. |

(Continued)

FOREIGN PATENT DOCUMENTS

CN          201181204 Y       1/2009

OTHER PUBLICATIONS

Francken, et al., "High Quality Mesostructure Acquisition Using Specularities", Proc. CVPR 2008.

(Continued)

*Primary Examiner* — Sath V Perungavoor
*Assistant Examiner* — Howard D Brown, Jr.
(74) *Attorney, Agent, or Firm* — Fitzpatrick, Cella, Harper & Scinto

(57) ABSTRACT

A depth value of an object is measured. The object is illuminated with a luminaire comprising at least three or more pixel-layers including a first pixel-layer, a second pixel-layer and a third pixel-layer, each pixel-layer including a rectangular array of pixels. One or more images are captured of the object illuminated by the pixel-layers of the luminaire. The depth value of a point on the surface of the object is determined based on the one or more captured images. The spaced-apart pixel-layers of the luminaire are grouped into at least a front group and a back group, and the front group is separated from the back group by a distance that is relatively large as compared to a distance by which the spaced-apart pixel-layers within any one group are separated.

24 Claims, 18 Drawing Sheets

(56) References Cited

U.S. PATENT DOCUMENTS

| | | |
|---|---|---|
| 8,081,840 B2 | 12/2011 | Laurent |
| 8,134,555 B2 | 3/2012 | Debevec et al. |
| 8,532,448 B1 | 9/2013 | Andle et al. |
| 8,648,907 B2 | 2/2014 | Kanamori |
| 2011/0285823 A1 | 11/2011 | Nabs et al. |
| 2011/0311107 A1 | 12/2011 | Levesque |
| 2012/0218464 A1 | 8/2012 | Ben-Moshe et al. |
| 2012/0237112 A1 | 9/2012 | Veeraraghavan et al. |
| 2012/0300038 A1 | 11/2012 | You et al. |
| 2013/0301908 A1* | 11/2013 | Shim ............ G06T 5/005 382/154 |
| 2014/0267185 A1* | 9/2014 | Arends ............ G06F 3/0304 345/179 |
| 2014/0268160 A1 | 9/2014 | Debevec et al. |
| 2014/0320605 A1 | 10/2014 | Johnson |
| 2014/0320633 A1 | 10/2014 | Haugen |
| 2014/0372075 A1* | 12/2014 | Kojima ............ G01B 11/00 702/167 |
| 2017/0124715 A1* | 5/2017 | Tin ............ H04N 9/045 |

OTHER PUBLICATIONS

Knuth, "The Art of Computer Programming, vol. 4, Fascicle 2: Generating All Tuples and Permutations", 2005.
Heide, et al., "Cascaded Displays: Spatiotemporal Superresolution using Offset Pixel Layers", SIGGRAPH 2014.
Clark, "Photometric Stereo with Nearby Planar Distributed Illuminants", Proceedings of CRV, p. 16, 2006.
Funk, et al., "Using a Raster Display for Photometric Stereo", Proceedings of CRV, pp. 201-207, 2007.
Healey, et al., "Local Shape from Specularity", Computer Vision, Graphics, and Image Processing, 42(1) pp. 62 to 86, 1988.
Tarini, et al., "3D acquisition of mirroring objects using striped patterns", Graphical Models, 67(4): pp. 233-259, Jul. 2005.
Bonfort, et al., "General Specular Surface Triangulation", Proceedings of ACCV, vol. 2, pp. 872-881, Jan. 2006.
Zongker, et al. "Environment Matting and Compositing", SIGGRAPH, pp. 205-214, 1999.
Aittala, et al., Practical SVBRDF Capture in the Frequency Domain:, SIGGRAPH 2013, 2013.
Ihrke, et al. "Transparent and Specular Object Reconstruction", Computer Graphics Forum, vol. 29, No. 8, pp. 2400-2426 (2010).
Francken, et al. "Gloss and Normal Map Acquisition of Mesostructures Using Gray Codes", Hasselt University (2009).
Tunwattanapong, et al., "Acquiring Reflectance and Shape from Continuous Spherical Harmonic Illumination", ACM TOG, SIGGRAPH 2013, 2013.
U.S. Appl. No. 14/937,648, filed Nov. 10, 2015. Applicant: Siu-Kei Tin.
U.S. Appl. No. 14/489,008, filed Sep. 17, 2014. Applicant: Siu-Kei Tin.

* cited by examiner

DEPTH VALUE MEASUREMENT

FIELD

The present disclosure relates to measurement of depth values, and more particularly relates to measurement of a depth value of a point on a surface of an object using illumination by pixel-layers.

BACKGROUND

Objects fabricated from a highly glossy material have reflection characteristics that differ significantly from those fabricated from a diffuse material. For example, whereas for a diffuse material light from a directional light source such as a projector is reflected in virtually all directions, for a highly glossy material, such light is reflected in primarily only one direction or at most only a few directions. These reflections are called "specular" reflections, and are caused by the shiny surface of the glossy material, which often has a mirror-like surface finish. As a consequence, an image of a highly glossy object illuminated by a directional light source is often completely dark, unless the camera is positioned at the precisely correct viewing direction so as to capture the specular reflection.

SUMMARY

Techniques exist for addressing the difficulty of specular reflection discussed above. One technique is to use an array of diffuse point light sources densely populating an angular range. Such technique would not, however, uniquely identify the direction of incoming illumination causing the specular reflection without knowledge of depth, a phenomenon sometimes known as the "depth-normal ambiguity". One solution to this ambiguity is to move the point light sources or the camera and thereafter obtain a second image capture. Such techniques are disadvantageous, however, since movement of system parts requires re-calibration. Another solution is to use far-field illumination, in which the point light sources are positioned such that their distances relative to the object is large compared to the scale of the object. Such a technique is disadvantageous since the resulting measurement system is relatively large.

It has also been considered to capture an image of an object illuminated by one or more light patterns effected by multiple pixel-layers. Each pixel-layer includes a rectangular array of pixels. A direction of incoming illumination is determined for a specular reflection at a point on the surface of the object. The depth value of the point on the surface of the object is determined based on the captured image and the direction of incoming illumination.

However, there is an ever increasing expectation to improve accuracy of the reconstruction required by different applications.

In view of the above, the foregoing situation is addressed through depth value measurement using a luminaire with three or more pixel-layers.

Thus, in an example embodiment described herein, a depth value of an object is measured. The object is illuminated with a luminaire comprising at least three or more pixel-layers including a first pixel-layer, a second pixel-layer and a third pixel-layer, each pixel-layer including a rectangular array of pixels. One or more images are captured of the object illuminated by the pixel-layers of the luminaire. The depth value of a point on the surface of the object is determined based on the one or more captured images. The spaced-apart pixel-layers of the luminaire are grouped into at least a front group and a back group, and the front group is separated from the back group by a distance that is relatively large as compared to a distance by which the spaced-apart pixel-layers within any one group are separated.

By performing depth value measurement using a luminaire with three or more pixel-layers in a front group and back group with the above-noted separation in distance, it is ordinarily possible to provide depth value measurement which benefits from angular super-resolution, resulting in subpixel accuracy that is higher in resolution than the pixel resolution of each individual pixel-layer of the luminaire.

In one example aspect, there are at least as many pixel-layers in the front group as there are in the back group.

In yet another example aspect, the object is illuminated with one or more light patterns corresponding to binary coded patterns displayed on the pixel-layers.

In still another example aspect, the captured images comprise images of light patterns from the luminaire as reflected by the surface of the object. In one example, at least one of the binary coded patterns is based on a Gray code.

In another example aspect, two of the binary coded patterns respectively displayed on two different pixel-layers are based on a long run-length Gray code.

In one example aspect, pixels in one of the pixel-layers have the same dot pitch and aspect ratio as pixels in one of the other pixel-layers.

In yet another example aspect, the depth value is determined at a resolution higher than the pixel resolution of each individual pixel-layer of the luminaire.

In one example aspect, multiple luminaries are positioned at different angular positions around an inspection station at which the object is positioned, and one or more images of the object illuminated by the pixel-layers of the multiple luminaire are captured. The depth value of a point on the surface of the object is determined based on the one or more captured images.

In another example aspect, the images are captured by a single image capture device.

In still another example aspect, the images are captured by multiple image capture devices positioned at different angular positions around an inspection station at which the object is positioned.

In one example embodiment, a depth value of an object is measured using a first illuminating step of illuminating the object with first and second pixel-layers of a luminaire. The luminaire comprises three or more spaced-apart pixel-layers including the first and second pixel-layers and a third pixel-layer, each pixel-layer including a rectangular array of pixels. One or more images are captured of the object illuminated with the first and second pixel-layers of the luminaire, and a preliminary pixel correspondence is estimated between pixels of the third pixel-layer and pixels of the first and second pixel-layers based on the captured images. There is a dynamical determination of a light pattern for illumination of the object by the second pixel-layer, based on the estimated preliminary pixel correspondence. A second illuminating step illuminates the object by the luminaire including displaying the dynamically determined light pattern on the second pixel-layer and displaying a predetermined light pattern on the third pixel-layer. Images of the object simultaneously illuminated by the second and third pixel-layers of the luminaire are captured, and the estimated preliminary pixel correspondence is refined based on the captured images. The depth values of a point on the surface of the object is determined using an illumination direction from a regression fitting based on the refined pixel correspondence among the three or more spaced-apart pixel-layers. The spaced-apart pixel-layers of the luminaire are grouped into at least a front group and a back group, and the front group is separated from the back group by a distance that is relatively large as compared to a distance by which the spaced-apart pixel-layers within any one group are separated.

This brief summary has been provided so that the nature of this disclosure may be understood quickly. A more complete understanding can be obtained by reference to the following detailed description and to the attached drawings.

DETAILED DESCRIPTION

Figure 1:
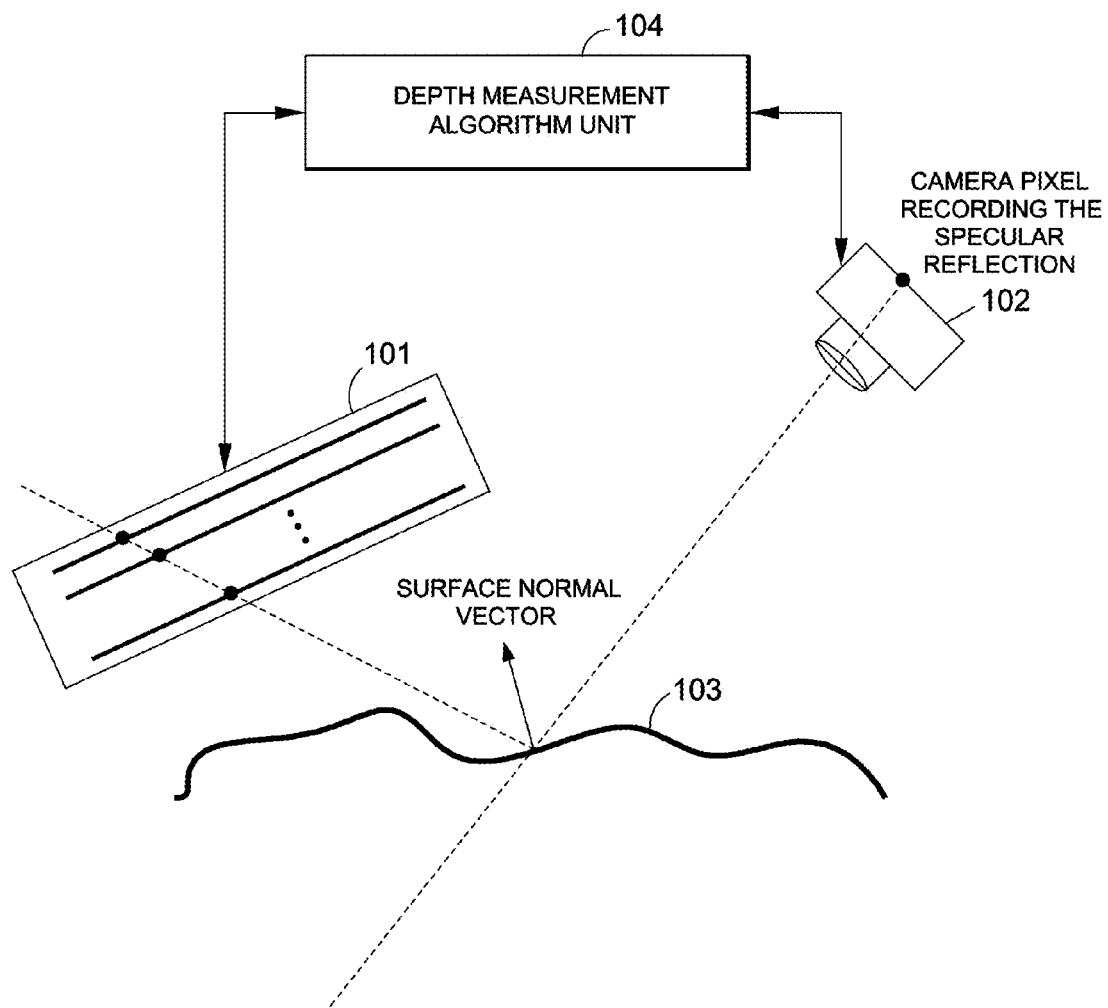
FIG. 1 illustrates an example embodiment of an environment in which aspects of the present disclosure may be practiced.

FIG. 1 illustrates an example embodiment of an environment in which aspects of the present disclosure may be practiced.

In particular, as shown in FIG. 1, luminaire 101 comprises multiple pixel-layers, each pixel layer including an array of pixels. Luminaire 101 effects illumination of the surface of an object 103.

In one aspect, the luminaire 101 comprises at least three pixel-layers in order to improve on depth reconstruction accuracy. More specifically, the luminaire 101 comprises at least three or more spaced-apart pixel-layers including a first pixel-layer, a second pixel-layer and a third pixel-layer, each pixel-layer including a rectangular array of pixels. A pixel-layer might include a two-dimensional array of pixels. A pixel-layer might be an array of spatial light modulator (SLM) pixels. Examples of SLM pixels include liquid crystal display (LCD) pixels and digital micromirror device (DMD) pixels.

According to the disclosure, a light pattern results from one or more coded patterns transmitted to the pixel-layers. There is a pixel resolution associated with each dimension of a layer, e.g., 1920×1080. A pixel ordinarily does not need to be self-luminous, i.e., it does not need to emit light by itself. For example, in a typical LCD display, there is a backlight source and the LCD panel modulates the backlight based on the image signal. In addition, in a color LCD display, each pixel consists of different color sub-pixels and is capable of modulating light intensity in different wavelength ranges and displaying colors. In one example aspect, pixels in one of the pixel-layers have the same dot pitch and aspect ratio as pixels in one of the other pixel-layers.

As will be described more fully below, the pixel-layers are grouped into at least a front group and a back group. The distance between the pixel-layers in the front group is relatively small compared to the collective distance between the front and the back group. Similarly, the distance between the pixel-layers in the back group is relatively small compared to the collective distance between the front and the back group. There are at least as many pixel-layers in the front group as there are in the back group. In one aspect, the accuracy of the depth measurement depends on the overall distance (D) between the front group and back group of the entire luminaire setup, such that a larger D improves accuracy. At the same time, however, the distance (d) between pixel-layers within a group can be made small to emulate an effect of pixel super-resolution such as at a resolution higher than the pixel resolution of each individual pixel-layer.

Specular reflections caused by the illumination are captured by image capture device 102. For purposes of simplicity, FIG. 1 depicts a single specular reflection at a point on the surface of object 103, and image capture device 102, depicted as a camera, captures and records the reflection in a corresponding single camera pixel. It should be understood that such specular reflection may be occurring at multiple points on the surface of object 103 and captured in multiple camera pixels of image capture device 102 at the same time. Moreover, additional embodiments may include multiple cameras, multiple or larger luminaires, and the like, as discussed below.

Although FIG. 1 specifically depicts image capture device 102 as a camera, it should be understood that various other capture devices may be used.

Depth measurement algorithm unit 104 communicates with luminaire 101 and image capture device 102, such as transmitting coded patterns to luminaire 101, or triggering image capture device 102 into capturing images.

In that regard, according to the arrangement shown in FIG. 1, it is ordinarily possible to measure a depth value of an object by illuminating object 103 with luminaire 101 comprising multiple spaced-apart pixel-layers, and determining a depth value of a point on the surface of object 103 based on a captured image of image capture device 102 and a direction of incoming illumination from a regression fitting, as discussed more fully below. Moreover, by using a luminaire 101 with three or more spaced-apart pixel-layers as described, it is ordinarily possible to improve the depth reconstruction accuracy.

In one example, it is assumed that all the pixel-layers in luminaire 101 and the image capture device 102 are geometrically and radiometrically calibrated individually prior to measurement of the object. Numerous procedures of calibration exist, and at the end of the calibration, the 3D position of any pixel for a camera or a pixel-layer can be determined or estimated from the device calibration.

In that regard, in a "direct" illumination method described more fully below, each pixel-layer may become "active" in a temporally sequential manner, as opposed to simultaneously. "Active" herein refers to the state of a pixel-layer displaying a coded pattern. In contrast, when a pixel-layer is not "active", it displays a full-screen of 0's or 1's. On the other hand, a "differential" illumination method described below includes two phases—a first phase in which each pixel-layer becomes active in a temporally sequential manner (similar to the "direct" method), and a second phase in which multiple pixel-layers may be active simultaneously.

Figure 2:
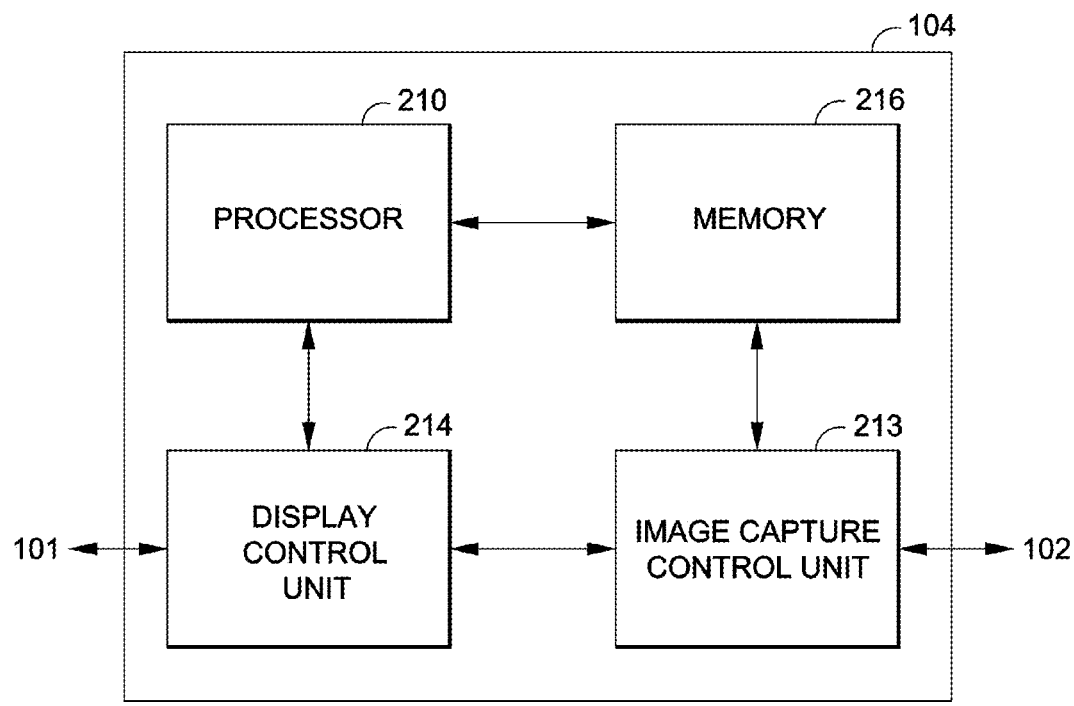
FIG. 2 is a block diagram for explaining an internal architecture of a depth measurement algorithm unit according to one example embodiment.

FIG. 2 is a simplified block diagram for explaining an internal architecture of a depth measurement algorithm unit 104 shown in FIG. 1 according to one example embodiment.

As shown in FIG. 2, depth measurement algorithm unit 104 includes processor (i.e., CPU) 210, which executes programs recorded in memory (e.g., main memory) 216 to implement respective processes to be described later. For example, processor 210 may receive coded patterns for illumination by multiple pixel-layers from memory 216, and control the pixel-layers to display such coded patterns via display control unit 214.

Memory 216 may be one or a combination of, for example, a non-volatile memory (e.g., a hard disk or other nonvolatile, non-transitory storage medium) a random access memory (RAM) for use as a main run-time transient memory, and a read only memory (ROM). Information stored in memory 216 is provided to processor 210 during execution of the instructions in software programs, such as an operating system, application programs, image processing modules, and device drivers. More specifically, processor 210 first loads computer-executable process steps from memory 216, and then processor 210 can execute the stored process steps in order to execute the loaded computer-executable process steps. Data, also, can be stored in memory 216 so that the data can be accessed by processor 210 during the execution of the computer-executable software programs, to the extent that such software programs have a need to access and/or modify the data.

Display control unit 214 (also referred to as "luminaire interface 214") controls the luminaire and its multiple pixel-layers, and the light pattern effected by one or more of the multiple pixel-layers is based on one or more coded patterns transmitted to the layer(s) from the display control unit 214. In one example, each of the plurality of pixel-layers successively or simultaneously becomes an "active" layer to receive transmission of a coded pattern. In that regard, an "active" layer as described herein is a pixel-layer including an array of pixels as described above that is receiving a coded pattern of spatially varying pixel values. A layer that is not an active layer receives, on the other hand, a constant pattern of spatially non-varying pixel values, effectively acting as a "pass-through" for another light source.

Image capture control unit 213 (also referred to as "camera interface 213") communicates with image capture device 102 via an internal or external connection and can be wired or wireless, such USB 3.0, IEEE 1394, GigE Vision, or IP (internet protocol)-based, among others.

Figure 3A:
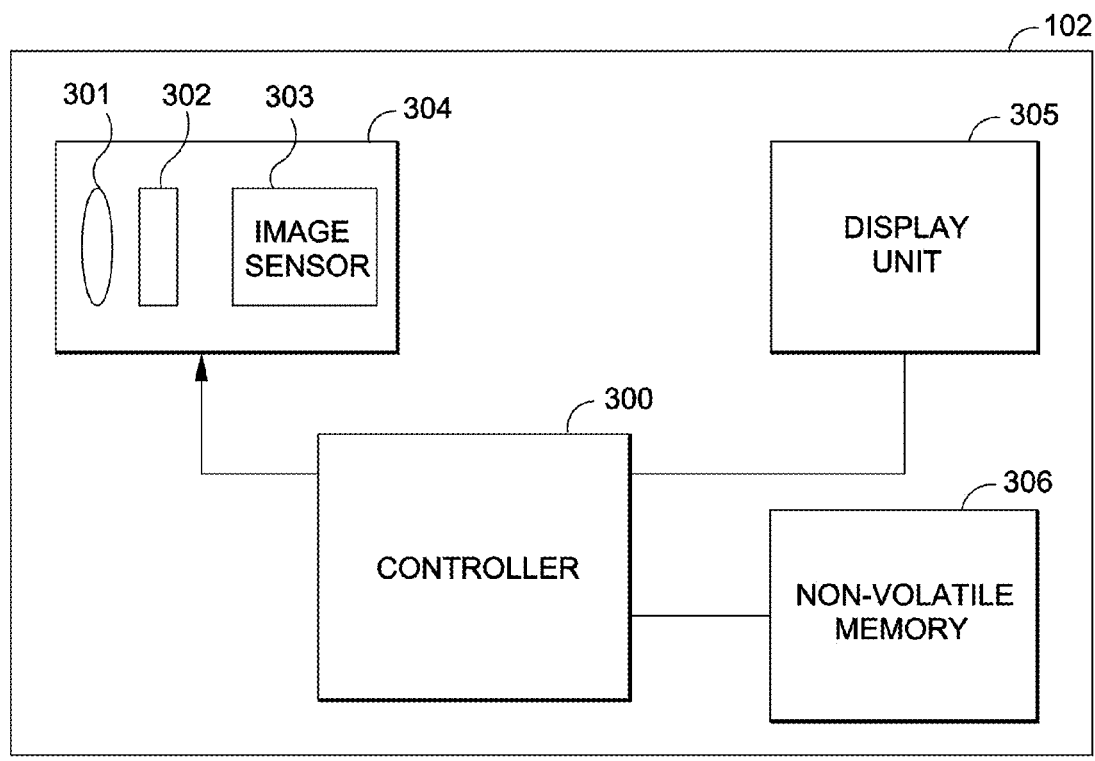
FIG. 3A is a block diagram for explaining the internal architecture of an image capture device according to one example embodiment.

FIG. 3A is a block diagram for explaining the internal architecture of the image capture device 102 shown in FIG. 1 according to one example embodiment.

As shown in FIG. 3A, image capture device 102 includes controller 300, which controls the entire image capture device 102. The controller 300 executes programs recorded in non-volatile memory 306 to implement respective processes to be described later. For example, controller 300 may control the optics (e.g., lens 301 and shutter 302) and image sensor 303 in order to capture an image; it may also perform image processing tasks and output captured images to memory including non-volatile memory or transient memory (not shown) to be transmitted externally.

Capture optics for image capture device 102 comprise capture assembly 304, which includes image sensor 303, shutter 302 and lens 301.

More specifically, reference numeral 301 denotes an imaging lens; 302, a shutter having an aperture function; and 303, an image sensor, which converts an optical image into an electrical signal. A shield or barrier may cover the capture assembly 304 to prevent imaging lens 301, shutter 302 and image sensor 303 from being contaminated or damaged.

Imaging lens 301 may be of a zoom lens, thereby providing an optical zoom function. The optical zoom function is realized by driving a magnification-variable lens of the imaging lens 301 using a driving mechanism of the imaging lens 301 or a driving mechanism provided on the main unit of the image capture device 102.

Image sensor 303 converts optical signals to electrical signals. In particular, image sensor 303 may convert optical signals obtained through the imaging lens 301 into analog signals, which may then be output to an A/D converter (not shown) for conversion to digital image data. Examples of image sensors include a charge-coupled device (CCD) or a complementary metal-oxide-semiconductor (CMOS) active-pixel sensor, although numerous other types of image sensors are possible.

A light beam (light beam incident upon the angle of view of the lens) from an object that goes through the imaging lens (image sensing lens) 301 passes through an opening of the shutter 302 having a diaphragm function, and forms an optical image of the object on the image sensing surface of the image sensor 303. The image sensor 303 is controlled by clock signals and control signals provided by a timing generator which is controlled by controller 300.

Display unit 305 is constructed to display menus, thumbnail images, and a preview image. Display unit 305 may be a liquid crystal screen, although other display hardware could be used depending on environment and use.

Non-volatile memory 306 is a non-transitory electrically erasable and recordable memory, and uses, for example, an EEPROM. The non-volatile memory 306 stores constants, computer-executable programs, and the like for operation of controller 300.

Figure 3B:
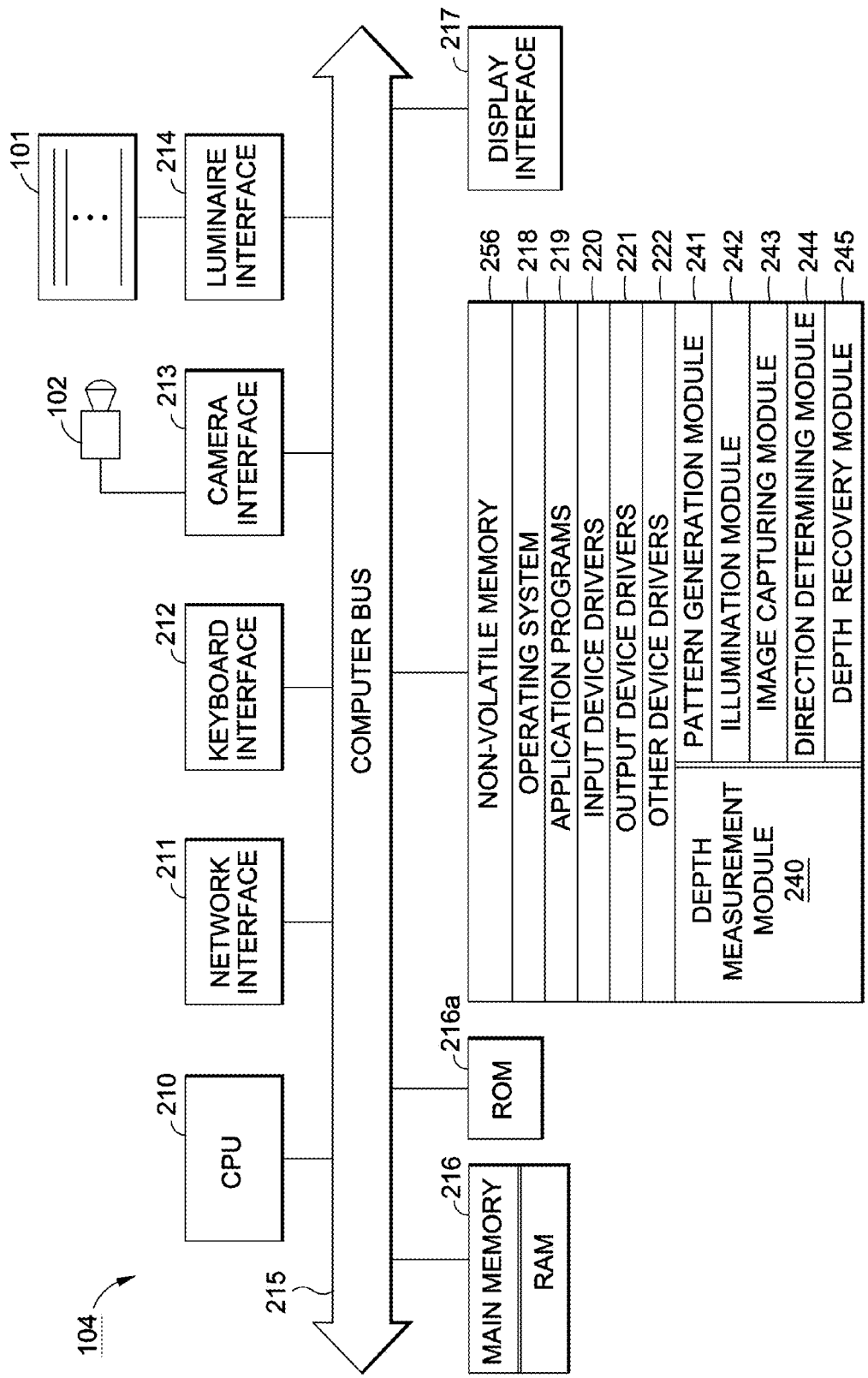
FIGS. 3B and 3C are views for explaining the architecture of a system for controlling depth value measurement according to an example embodiment.

FIG. 3B is a more detailed view for explaining the architecture of depth measurement algorithm unit 104, which is a system for controlling depth value measurement according to an example embodiment. The depth measurement algorithm unit 104 is shown in FIG. 1 as a standalone computer constructed to interface with capture device 102 and illumination assembly 101 however, the functionality of depth measurement algorithm unit 104 can also, for example, be incorporated into capture device 102 itself.

As shown in FIG. 3B, depth measurement algorithm unit 104 includes central processing unit (CPU) 210, which interfaces with computer bus 215. Also interfacing with computer bus 215 are non-volatile memory 256 (e.g., a hard disk or other nonvolatile storage medium), network interface 211, keyboard interface 212, camera interface 213, random access memory (RAM) 216 for use as a main run-time transient memory, read only memory (ROM) 216a, and display interface 217 for a display screen or other output.

RAM 216 interfaces with computer bus 215 so as to provide information stored in RAM 216 to CPU 210 during execution of the instructions in software programs, such as an operating system, application programs, image processing modules, and device drivers. More specifically, CPU 210 first loads computer-executable process steps from non-volatile memory 256, or another storage device into a region of RAM 216. CPU 210 can then execute the stored process steps from RAM 216 in order to execute the loaded computer-executable process steps. Data, also, can be stored in RAM 116 so that the data can be accessed by CPU 210 during the execution of the computer-executable software programs, to the extent that such software programs have a need to access and/or modify the data.

As also shown in FIG. 3B, non-volatile memory 256 contains computer-executable process steps for operating system 218, and application programs 219, such as graphic image management programs. Non-volatile memory 256 also contains computer-executable process steps for device drivers for software interface to devices, such as input device drivers 220, output device drivers 221, and other device drivers 222.

Non-volatile memory 236 also stores a depth measurement module 240. The surface measurement module 240 comprises computer-executable process steps for determining the depth value of a point on the surface of the object based on one or more captured images.

As shown in FIG. 3B, surface measurement module 240 generally includes pattern generation module 241 for generating and transmitting one or more coded patterns for the light pattern to one or more pixel-layers of illumination assembly 101 (e.g. luminaire 101), as described more fully below. Also included in surface measurement module 240 is illumination module 242 for activating the multiple pixel-layers of the luminaire to illuminate the object in accordance with the transmitted pattern.

Image capturing module 243 is for capturing one or more images of the object as it is illuminated with the multiple coded patterns using image capture device 102. Direction determining module 244 is for determining a unique incident light ray direction for one or more pixels of the captured images by decoding the combinations of the multiple coded patterns. Depth recovery module 245 is for determining a depth value of a point on the surface of the object by triangulation of the unique incident light ray direction and a viewing direction for each of the one or more pixels of the captured images.

These modules will be discussed in more detail below with respect to FIG. 3C.

The computer-executable process steps for these modules may be configured as part of operating system 218, as part of an output device driver in output device drivers 221, or as a stand-alone application program. These modules may also be configured as a plug-in or dynamic link library (DLL) to the operating system, device driver or application program.

It can be appreciated that the present disclosure is not limited to these embodiments and that the disclosed modules may be used in other environments.

Figure 3C:
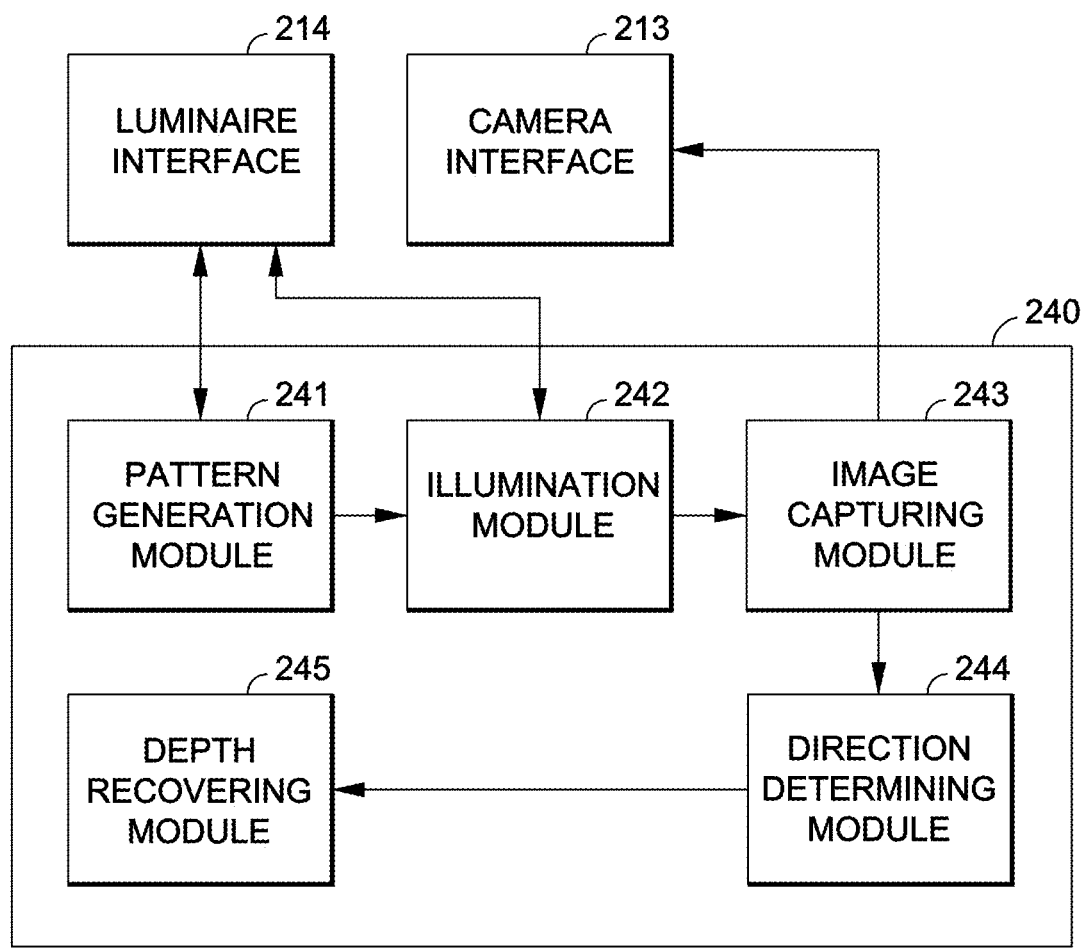

FIG. 3C is a view for explaining depth measurement module 240 according to an example embodiment. As previously discussed with respect to FIG. 3B, depth measurement module 240 comprises computer-executable process steps stored on a non-transitory computer-readable storage medium, such as non-volatile memory 256.

As shown in FIG. 3C, depth measurement module 240 includes pattern generation module 241 for generating and transmitting one or more coded patterns for the light pattern to one or more pixel-layers of illumination assembly 101 (e.g. luminaire 101). To that end, positioning module 241 communicates with luminaire interface 214. As discussed above, illumination module 242 is for activating the multiple pixel-layers of the luminaire to illuminate the object in accordance with the transmitted pattern. Image capturing module 243 is for capturing one or more images of the object as it is illuminated with the multiple coded patterns and communicates with camera interface 213, which controls the positioning of the image capture device and is configured to receive image data from the image capture device. The resultant images may be stored, for example in non-volatile memory 256. Direction determining module 244 uses the image captured by image capture module 243 to determining a unique incident light ray direction for one or more pixels of the captured images by decoding the combinations of the multiple coded patterns. Depth recovery module 246 determines points on the surface of the object by triangulation of the unique incident light ray direction and a viewing direction for each of the one or more pixels of the captured images. The determined unique incident light ray directions, surface normal vector field, and determined points on the surface of the object may all be stored with the image data, for example, in non-volatile memory 256.

Figure 4:
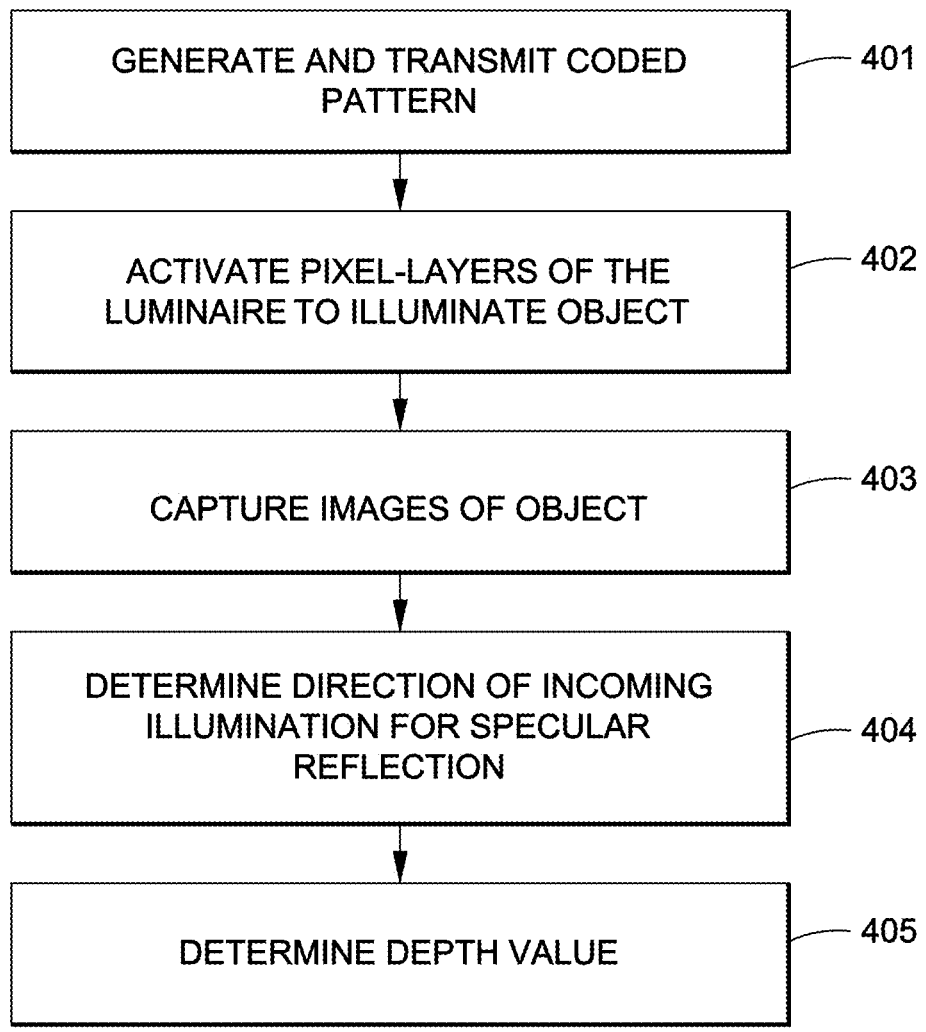
FIG. 4 is a flowchart illustrating a process for measuring a surface profile of an object according to example embodiments.

FIG. 4 is a flowchart summarizing a general process for measuring a depth value of an object according to example embodiments.

Briefly, as shown in FIG. 4, a depth value of an object is measured. The object is illuminated with a luminaire comprising at least three or more pixel-layers including a first pixel-layer, a second pixel-layer and a third pixel-layer, each pixel-layer including a rectangular array of pixels. One or more images are captured of the object illuminated by the pixel-layers of the luminaire. The depth value of a point on the surface of the object is determined based on the one or more captured images. The spaced-apart pixel-layers of the luminaire are grouped into at least a front group and a back group, and the front group is separated from the back group by a distance that is relatively large as compared to a distance by which the spaced-apart pixel-layers within any one group are separated.

In particular, in step 401, one or more coded patterns for the light pattern are generated and transmitted to one or more pixel-layers of luminaire 101. In one example, a pixel-layer is designated as an active layer, a coded pattern of spatially varying pixel values is transmitted to the active layer, and a constant pattern of spatially non-varying pixel values is transmitted to the pixel-layers that are not the active layer. In step 402, the multiple pixel-layers of the luminaire are activated to illuminate the object in accordance with the transmitted pattern(s). In step 403, image capture device 102 captures images of the illuminated object. The captured image(s) comprise one or more images of light patterns from the luminaire as reflected by the surface of the object.

In step 404, a direction of incoming illumination is determined for a specular reflection in an image, and in step 405, a depth value of a point on the surface of the object is determined, based on the captured image and the direction of incoming illumination. Each of these processes will be described more fully below.

Figure 5:
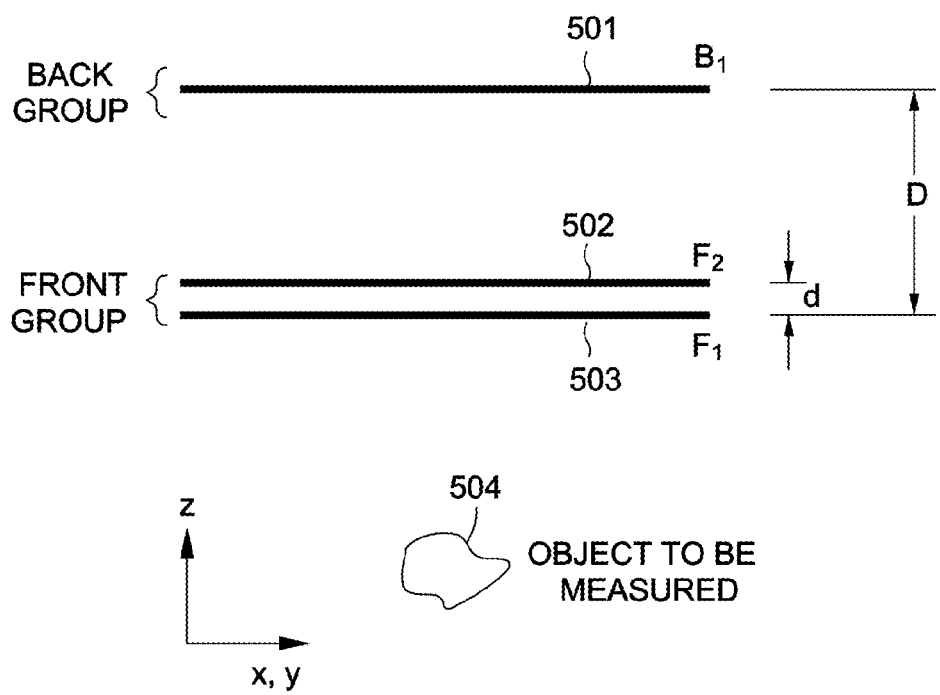
FIG. 5 is a view for explaining a structural arrangement of a luminaire according to an example embodiment.

FIG. 5 is a view for explaining a structural arrangement of a luminaire according to an example embodiment.

As shown in FIG. 5, three pixel-layers are separated into a "front" group consisting of layers $F_1$ and $F_2$ (reference numbers 502 and 503) and a "back" group consisting of layer $B_1$ (reference number 501). The two layers 502 and 503 in the front group are separated by a very small distance d, e.g., d=1 mm. The front and back group collectively are separated by a relatively large distance D, e.g., D=40 mm. In other words, the ratio D:d is a relatively large number, such as D:d=40:1. In one embodiment, the pixel-layers within each group have the same pixel dot pitch and aspect ratio. Meanwhile, an object to be measured 504 lies some distance away from the luminaire.

More generally, a design can be considered where the front group consists of N pixel-layers and the back group consists of M pixel-layers. In one example embodiment, M=2, N=3, as shown in FIG. 6.

Figure 6:
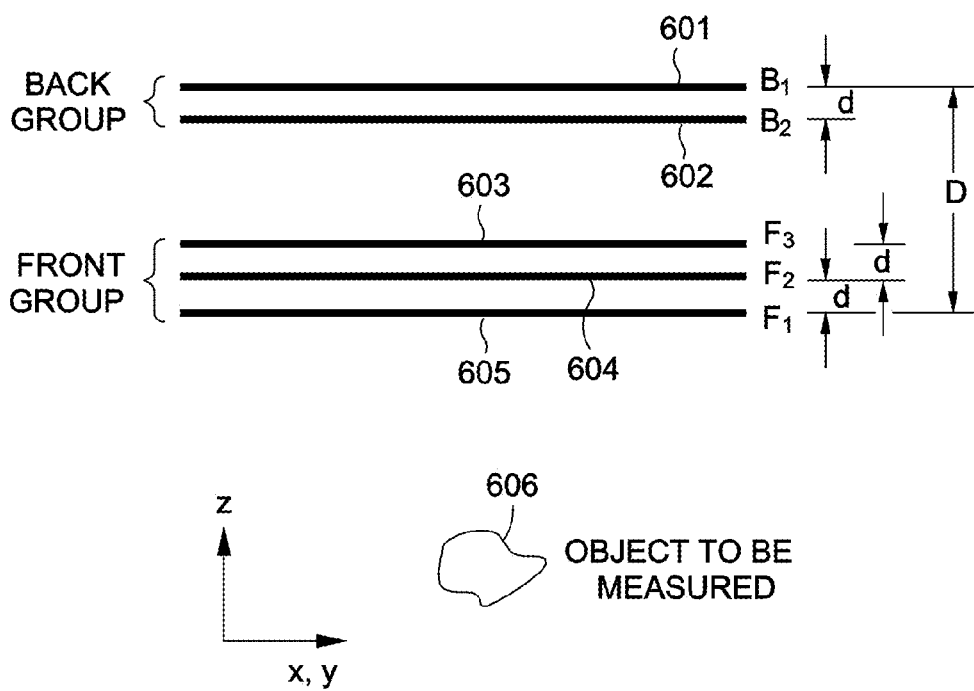
FIG. 6 is a view for explaining a structural arrangement of a luminaire according to another example embodiment.

In particular, as shown in FIG. 6, a back group comprises pixel-layers $B_1$ and $B_2$ (601 and 602, respectively), a front group comprises pixel-layers $F_3$, $F_2$ and $F_1$ (603, 604 and 605, respectively), and an object 606 is to be measured. In this example, the parameter values may also be d=1 mm, D=40 mm.

According to aspects herein, an object (e.g., object 606) is illuminated with one or more light patterns corresponding to binary coded patterns displayed on the pixel-layers.

Figure 7:
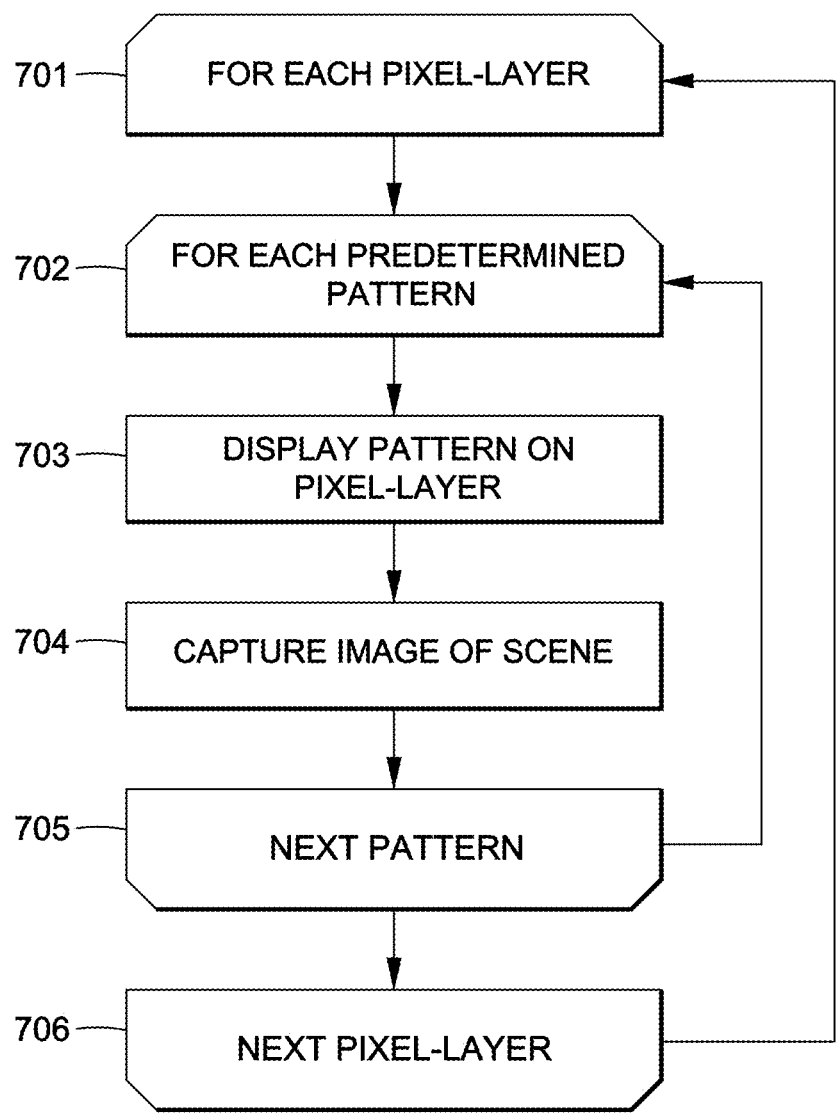
FIG. 7 is a flow diagram for explaining an illumination and capture phase according to an example embodiment.

FIG. 7 is a flow diagram for explaining an illumination and capture phase according to an example embodiment.

Insofar as illumination and capture, there are two example embodiments, respectively referred to herein as a "direct method" and a "differential method".

In particular, the "direct method" treats each pixel-layer independently, and only one pixel-layer is active at a time. In one example, at least one of the binary coded patterns is based on a Gray code. A Gray code of particularly simple construction is the so-called "reflected Gray code" where the code in its primary form may be built up from the conventional binary code by a sort of reflection process. Thus, the predetermined patterns can be reflected Gray code binary patterns and their binary inverted patterns. An inverted pattern of a binary pattern is obtained simply by replacing a binary value at a pixel by its Boolean negation, e.g., replacing 0 by 1 and 1 by 0. For example, if the pixel-layers comprise LCD panels and each LCD panel is of pixel resolution 1920×1080, then 11-bit Gray code patterns and their inverted patterns can be used. In addition, the Gray code patterns are displayed as horizontal and vertical stripes. In this example, then, the total number of patterns/captured images is therefore 11×2×2×N, where N is the number of LCD panels.

Thus, in step 701, a process begins for each pixel-layer of the luminaire, and in step 702, for each of the predetermined patterns (e.g., the reflected Gray code binary patterns and their binary inverted patterns). In particular, the pattern is displayed on the pixel-layer in step 703, and an image of the scene is captured in step 704. The process then proceeds to step 705 to the next pattern by looping back to step 702, until each predetermined pattern is displayed, after which the process proceeds to step 706 to advance to the next pixel-layer of the luminaire.

At the end of the image capture phase, there is a stack of images corresponding to each pixel-layer.

Figure 8:
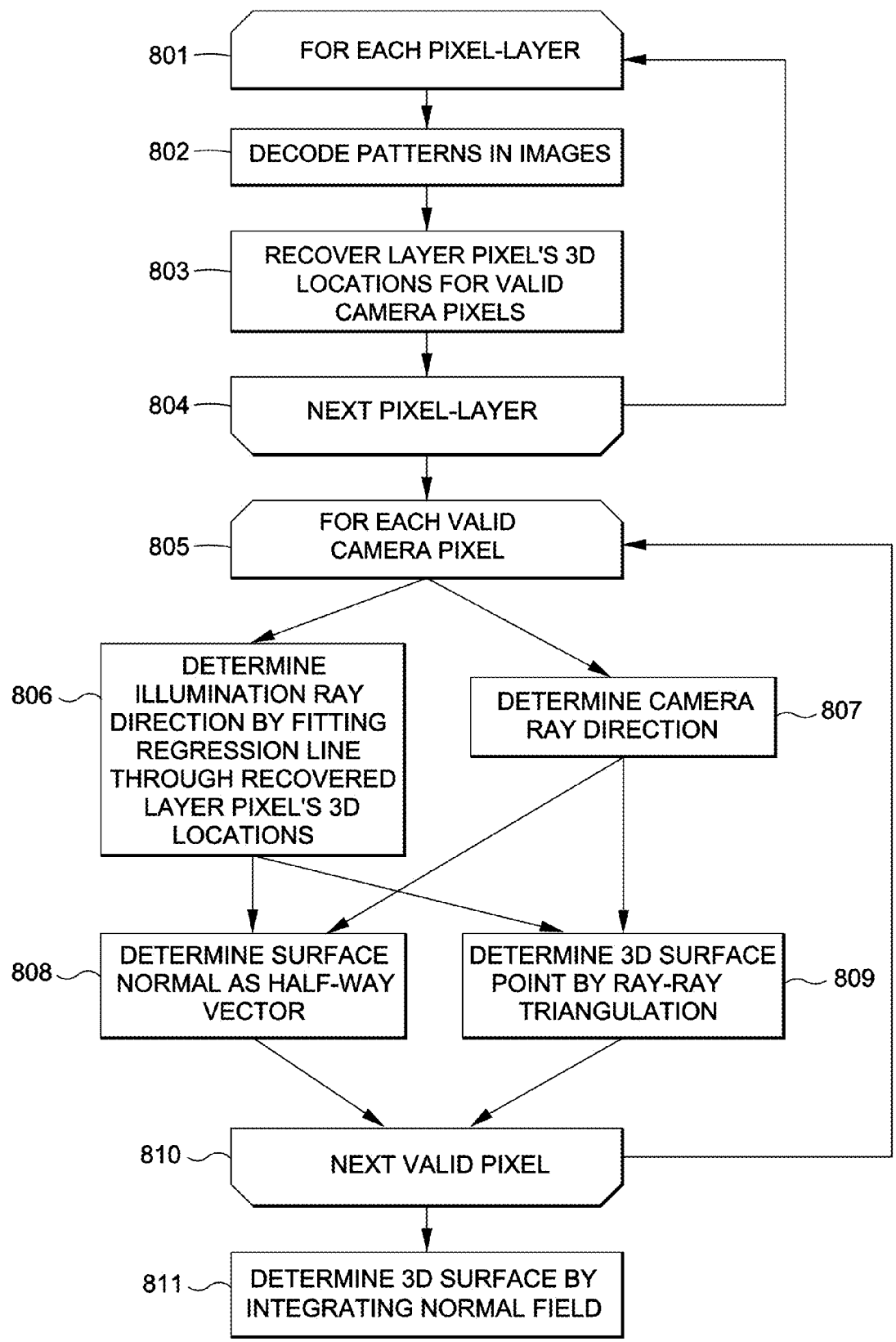
FIG. 8 is a flow diagram for explaining reconstruction of a surface profile according to an example embodiment.

FIG. 8 summarizes the steps in reconstructing a surface normal field and/or surface points (i.e., depth measurements). In particular, in step 801, a process begins for each pixel-layer.

In step 802, patterns in the images corresponding to the pixel-layer are decoded by taking the stack of captured images and processing them to determine an "index map". An index map associates each "valid" camera pixel with either a row index or a column index for the pixel on the pixel-layer that causes a specular reflection recorded at the "valid" camera pixel in question. In other words, a "valid" camera pixel receives specular reflection originating from a pixel on the pixel-layer, and the row (resp. column) index map gives the row (resp. column) index of that pixel on the pixel-layer. In more detail, the process of determining an index map by decoding the patterns in the images includes the step of binarization, in which captured images are converted to binary images by a method of thresholding, and the step of decoding the Gray code, in which the pixel values (which are binary Gray codes) of binarized images are converted back to pixel index numbers. The process of decoding is fundamentally different for the "direct method" and the "differential method" because the kind of Gray code used is fundamentally different. In the case of the "direct method", the Gray code used is reflected Gray code, and the step of decoding is relatively straightforward, involving a straightforward decoding of the reflected Gray code. In the case of the "differential method", long run-length Gray code is used in some of the images, and the step of decoding is more complex and will be described more fully below.

In step 803, pixel-layer pixels' 3D locations are recovered for valid camera pixels from the decoded index maps. A valid camera pixel is a camera pixel that receives a specular reflection from the object being measured. The decoded row and column index maps for the pixel-layer pixels are used to recover their 3D locations based on the geometric calibration of the pixel-layer in question.

In step 804, the process proceeds to the step 801 for the next pixel-layer, or, if all pixel-layers have been processed, the process proceeds to step 805.

In step 805, a process begins for each valid camera pixel, to reconstruct a surface normal or a 3D surface point.

Specifically, in step 806, an illumination ray direction is determined by fitting a regression line through recovered pixel-layer pixels' 3D locations. Independently, a camera ray direction is determined in step 807.

This information can be used both in step 808, where a surface normal is determined as a half-way vector, or in step 809, where a 3D surface point is determined by ray-ray triangulation. In that regard, additional details of reconstruction in this manner can be found in U.S. patent application Ser. No. 14/489,008, entitled "Depth Value Measurement", by Siu-Kei Tin et al., the contents of which are incorporated by reference herein.

Next, the process proceeds to step 810, where it returns to step 805 to process the next valid camera pixel.

In step 811, the collection of surface normal vectors for valid camera pixels constitutes a surface normal field, and upon integration, results in a 3D surface constituting 3D surface points. Normal field integration provides an alternative approach to ray-ray triangulation for depth measurement and is typically at least one order of magnitude more accurate than triangulation approaches, which are known to yield noisy measurements.

The "differential method" aims to reduce the total number of patterns for all pixel-layers. The differential method includes two capture phases (referred to hereinafter as "Phase I" and "Phase II").

The process for capture Phase I can be similar to the Direct Method, applied to selected pixel-layers. Accordingly, for purposes of conciseness, details of the steps are not repeated here. Briefly, the steps are identical to the steps shown in FIG. 7, with the exception that they are only applied to non-interior pixel-layers. More specifically, each pixel-layer may be pre-designated as either "interior" or "non-interior", with the exception that pixel-layers $B_1$ and $F_1$ must be designated as "non-interior". The designation may be otherwise arbitrary. For example, in a luminaire comprising N front pixel-layers and M back pixel-layers, all M back pixel-layers $B_1, B_2, \ldots, B_M$ may be designated as "non-interior" while $F_1$ is "non-interior" by mandate and $F_2, \ldots, F_N$ may be designated as "interior".

Figure 9:
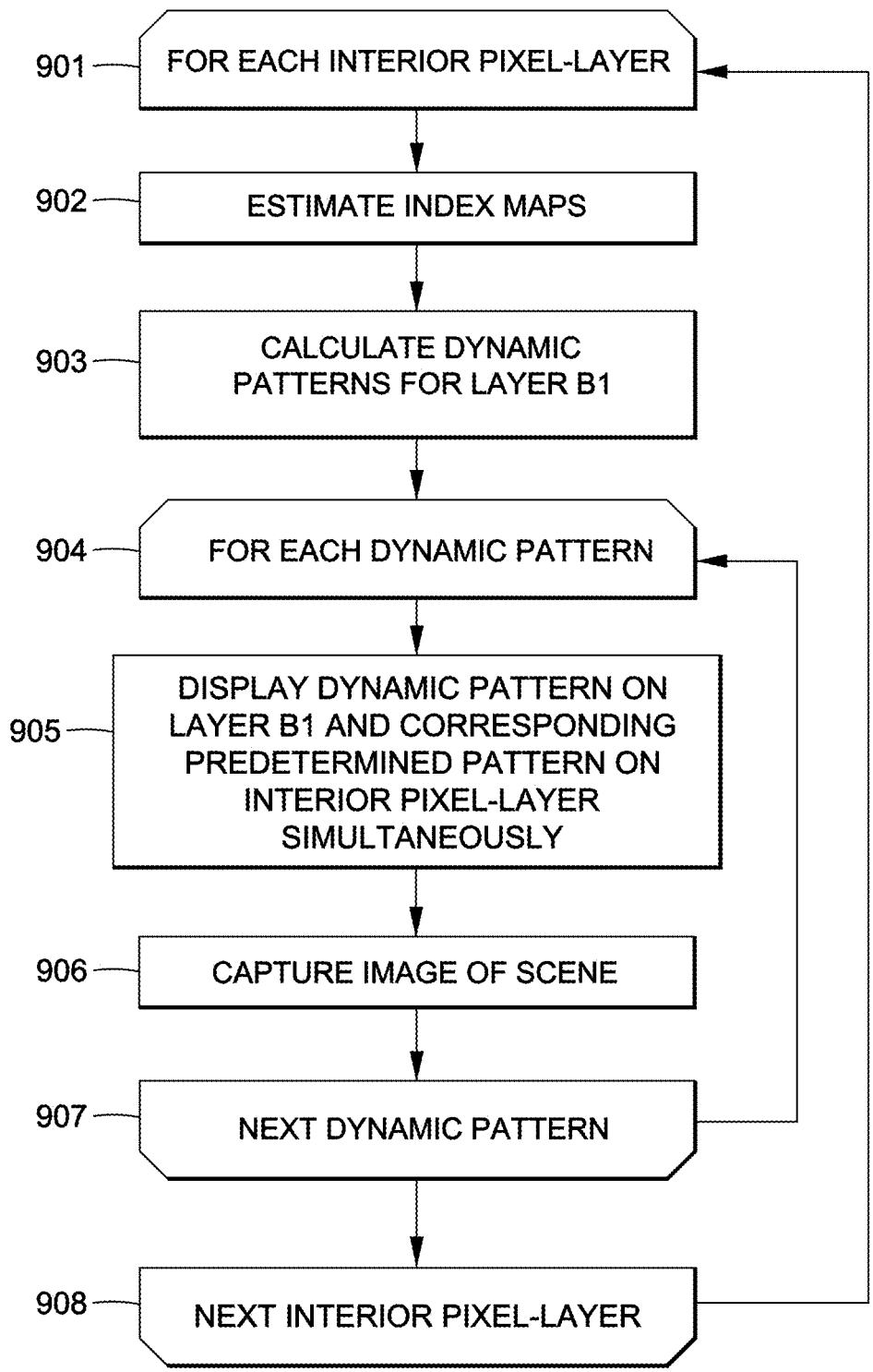
FIG. 9 is a flow diagram for explaining a second capture phase of a differential method for reconstruction according to an example embodiment.

The steps for capture Phase II are summarized in FIG. 9.

In that regard, for each valid camera pixel, there is a corresponding illumination ray that intersects each pixel-layer. The intersection point is described in quantized pixel coordinates on each pixel-layer, i.e., row and column indices of the pixel-layer pixel, or coordinates of the pixel.

As the camera pixel varies, it is possible to obtain "index maps" corresponding to the row and column indices. As mentioned above, for layers $F_1$ and $B_1$, the index maps are determined directly by reflected Gray code patterns (hence the name "Direct Method"). For other interior pixel-layers, the Differential Method proposes to determine the index maps indirectly, in 2 steps:

1. Estimating the index map from Phase I measurements for pixel-layers $F_1$ and $B_1$.
2. Determining a correction to be applied to the estimated index map by displaying patterns that depend on the Phase I measurements.

Thus, in step 901, a process begins for each interior pixel-layer of the luminaire.

Figure 10:
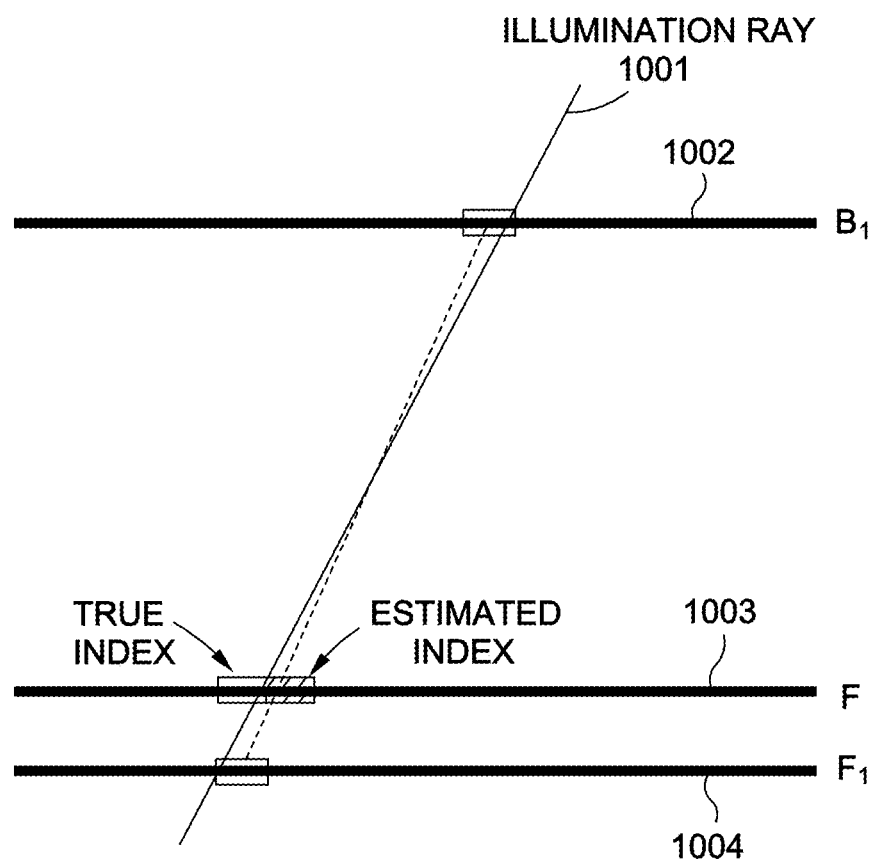
FIG. 10 is a view for explaining an estimated index between pixel-layers of the luminaire according to an example embodiment.

In step 902, index maps are estimated. Specifically, as shown in FIG. 10, for each valid camera pixel, the intersection points (indexes/indices) on layers $F_1$ and $B_1$ (1004 and 1002) have been determined from Phase I measurements. The dotted line, which connects the centers of the pixels on $F_1$ and $B_1$ that correspond to the determined indices, is used to estimate the index on an interior pixel-layer F (1003). Specifically, the index that corresponds to the intersection point between the dotted line and layer F is taken to be the estimated index. As also suggested in the figure, the true index on layer F for illumination ray 1001 may be different from the estimated index. Thus, a correction may be needed.

More specifically, the discrepancy results from approximating the true illumination ray 1001 by the dotted line that connects the centers of the pixels on $F_1$ and $B_1$. Consequently, intersection with an interior pixel-layer may be in error. On the other hand, this error, i.e., difference between estimated intersection and true intersection, is expected to be small. Accordingly, one goal of Phase II measurement is to estimate the difference from the true intersection for each pixel, using a long run-length Gray code as described more fully below.

Figure 13:
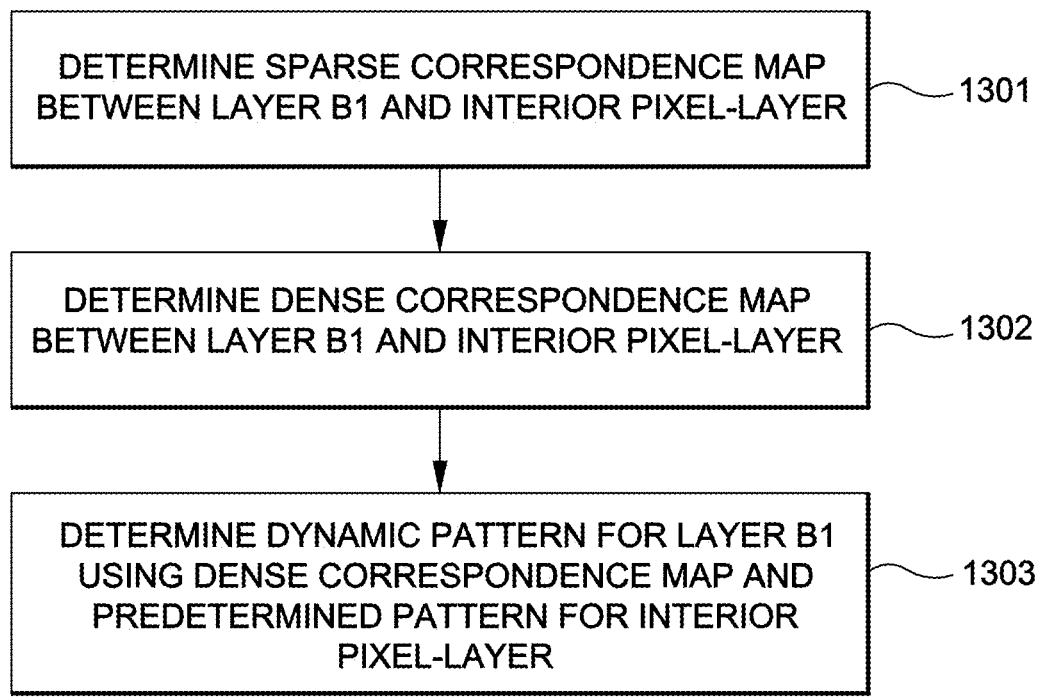
FIG. 13 is a flow diagram for explaining determination of dynamic patterns according to an example embodiment.
Figure 14:
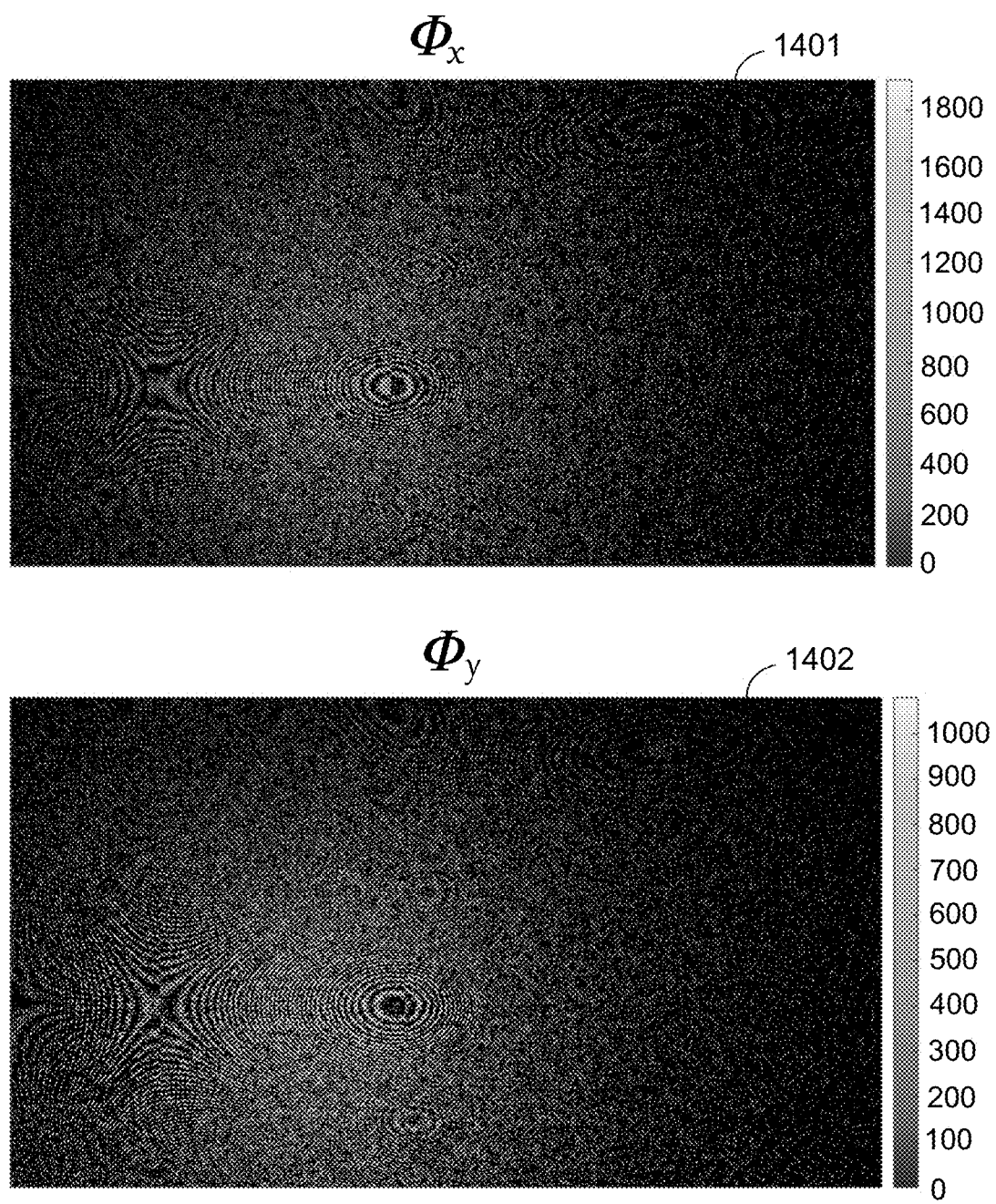
FIG. 14 is a view for explaining a sparse correspondence map according to an example embodiment.
Figure 15:
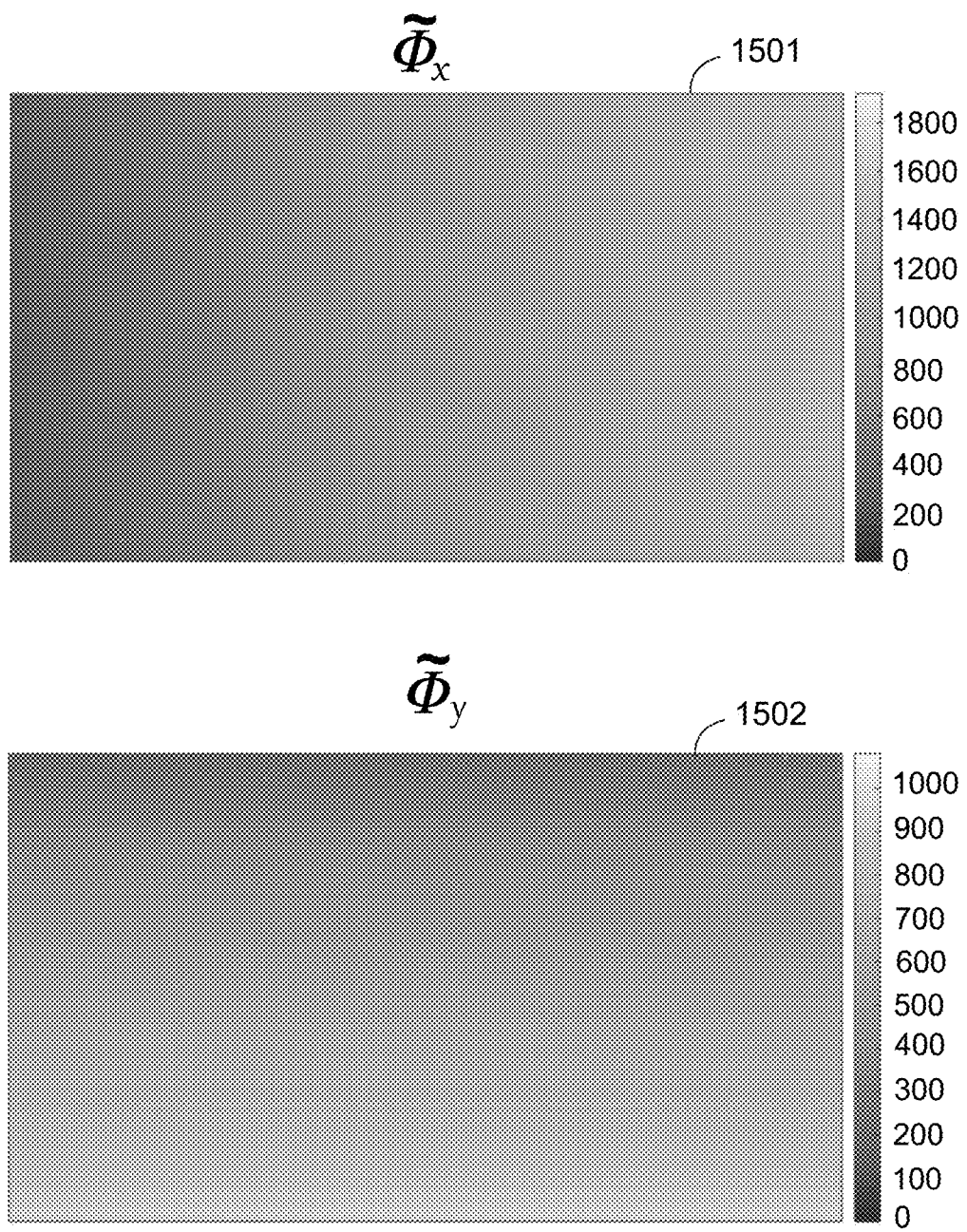
FIG. 15 is a view for explaining a dense correspondence map according to an example embodiment.

In step 903, dynamic patterns are calculated for layer $B_1$ In that regard, "dynamic" implies "not predetermined", more specifically that the patterns depend on measurements from Phase I, and also in the sense that they depend on the object being measured, and therefore must be determined "on the fly". FIGS. 13 to 15 describe the steps in determining the dynamic patterns on pixel-layer $B_1$, and will be explained more fully below.

In step 904, a process begins for each dynamic pattern.

Namely, in step 905, the dynamic pattern is displayed on layer $B_1$, and simultaneously a corresponding predetermined pattern is displayed on the interior pixel-layer (e.g., layer F in FIG. 10).

In this regard, in FIG. 10, layer F is an interior pixel-layer for which there is a need to determine a correction for its estimated index map. On layer F, predetermined binary patterns based on a 5-bit long run-length Gray code will be displayed.

Specifically, this 5-bit long run-length Gray code (which is different from the "standard" reflected Gray code) is defined by "delta sequence" (0123042103210423), see Knuth D. E., "*The Art of Computer Programming, Volume 4, Fascicle 2: Generating All Tuples and Permutations*", 2005. It corresponds to a permutation of integers $0, 1, 2, \ldots, 31$ which when expressed in binary representation gives 5 binary patterns (bit planes), 32 pixels wide or tall, depending on whether it is used for vertical striped patterns or horizontal striped patterns, respectively.

Because the pixel resolution of a pixel-layer is typically larger than 32 pixels (e.g., 1920×1080), and because this long run-length Gray code is cyclic (i.e., it corresponds to a closed circuit of the edge graph on a 5-dimensional cube), the 32-pixel binary patterns can be extended periodically to cover the whole screen of the pixel-layer.

Thus, according to the embodiment, two of the binary coded patterns respectively displayed on two different pixel-layers are based on a long run-length Gray code.

Figure 11:
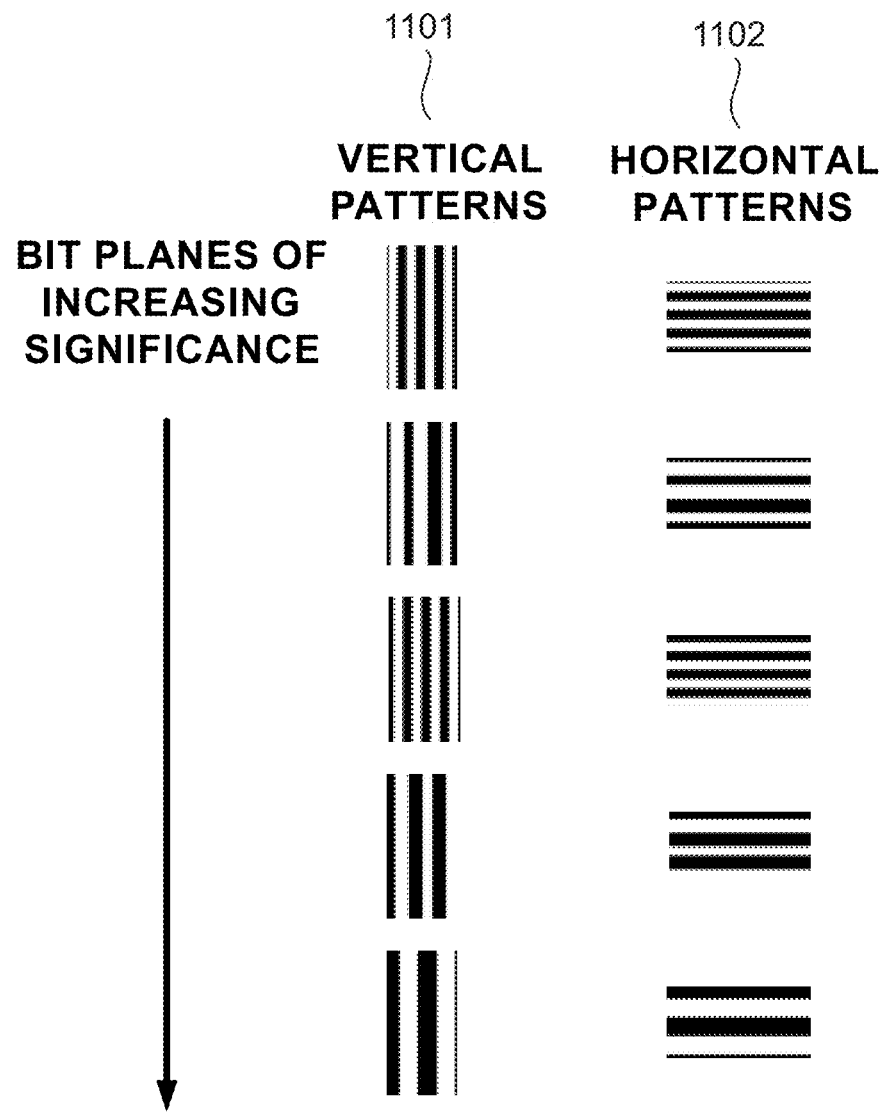
FIG. 11 is a visualization of vertical and horizontal patterns according to an example embodiment.
Figure 12:
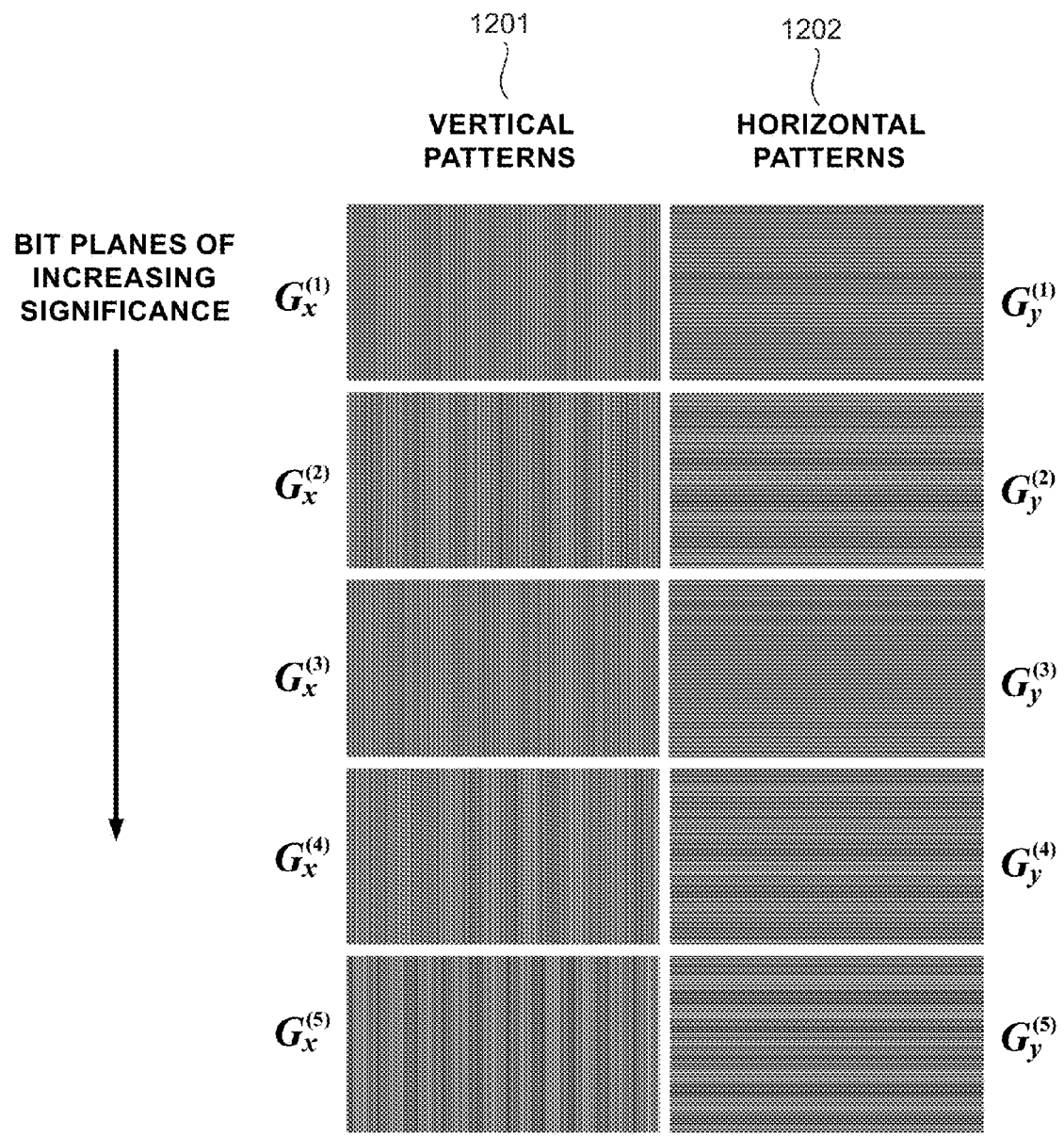
FIG. 12 is a visualization of vertical and horizontal patterns according to another example embodiment.

FIG. 11 shows a visualization of vertical and horizontal patterns (1101 and 1102) without the periodic extension, and FIG. 12 shows a visualization of vertical and horizontal patterns (1201 and 1202) with the periodic extension, resulting in full screen patterns (at 1920×1080).

It should be noted from the first visualization (FIG. 11) that, unlike the reflected Gray code, the run-lengths of the bit planes are about the same. The minimum run-length (mrl) among all the bit planes is 4 for this Gray code. It follows that if the ordinal positions of two codes $g_i$ and $g_j$ are sufficiently close, more precisely if $|i-j| \le 4$, then the relative offset between the ordinal positions can be recovered from the Hamming distance: $|i-j|=d_H(g_i,g_j)$. In turn, as will be described, the Hamming distance can be determined from the captured images.

More generally, if it is assumed that the mrl of a (long run) Gray code is $2\sigma$, and the difference between the estimated index $\hat{i}$ and the true index i satisfies $|i-\hat{i}| \le \sigma$, then $|i-\hat{i}+\sigma| \le 2\sigma$ and from the definition of mrl, $d_H(g_i,g_{\hat{i}-\sigma})=|i-\hat{i}+\sigma|=i-\hat{i}+\sigma$ since $i-\hat{i}+\sigma \ge 0$ by our assumption.

It follows, then, that $i=\hat{i}+\Delta$ where $\Delta=d_H(g_i,g_{\hat{i}-\sigma})-\sigma$ is the correction term for the estimated index of the pixel. This equation provides the index difference from the Hamming distance which in turn can be estimated from captured images.

Because the 5-bit long run Gray code has an mrl of 4, i.e., $\sigma=2$, it is possible to to make the right correction to the estimated index if error in the estimated index is at most 2 pixels. In the following, the predetermined vertical and horizontal patterns will be denoted by $G_x^{(k)}(j)$ and $G_y^{(k)}(i)$ respectively, where $k=1, 2, \ldots, 5$, and a visualization of these binary patterns is provided in FIG. 12.

Returning to FIG. 9, in step 906, the image of the scene is captured, and the process proceeds in step 907 to the next dynamic pattern, or, if all dynamic patterns are processed, to the next interior pixel-layer in step 908.

Therefore, in this embodiment, in the first illuminating step (Phase I), at least one of the binary coded patterns is based on a Gray code, and in the second illuminating step (Phase II), two of the binary coded patterns respectively displayed on two different pixel-layers are based on a long run-length Gray code.

Returning now to step 903 in more detail, dynamic patterns are calculated for layer $B_1$ (e.g., from FIG. 5 or FIG. 6). In this case, "dynamic" implies "not predetermined", more specifically that the patterns depend on measurements from Phase I, and also in the sense that they depend on the object being measured, and therefore must be determined "on the fly". FIG. 13 summarizes the steps in determining the dynamic patterns on layer $B_1$.

In step 1301, a sparse correspondence map is determined between layer $B_1$ and the interior pixel-layer.

In that regard, for each valid camera pixel p, let the measured indices and estimated indices of the corresponding pixel-layer pixels on $B_1$ and F be $(I_{B1}(p), J_{B1}(p))$ and $(\hat{I}_F(p), \hat{J}_F(p))$ respectively. The sparse correspondence map $(\Phi_x, \Phi_y)$ relates these indices:

$$\Phi_x(i,j)=[\text{Avg}\{\hat{J}_F(p)|I_{B1}(p)=i,J_{B1}(p)=j\}]$$

$$\Phi_y(i,j)=[\text{Avg}\{\hat{I}_F(p)|I_{B1}(p)=i,J_{B1}(p)=j\}],$$

where [•] denotes the operation of rounding to the nearest integer and Avg denotes the operation of averaging the values in the set. Averaging may be necessary because there may be multiple camera pixels p satisfying the condition $I_{B1}(p)=i, J_{B1}(p)=j$.

It should be noted that in general, the map is defined only at sparse locations. For example, FIG. 14 depicts a sparse correspondence map with $(\Phi_x, \Phi_y)$ depicted as maps 1401 and 1402, respectively. In FIG. 14, a "black pixel" indicates that the correspondence map is undefined for that pixel-layer pixel on $B_1$.

In step 1302, a dense correspondence map is determined between layer $B_1$ and the interior pixel-layer.

Specifically, from the sparse correspondence map, it is possible to interpolate/extrapolate to a dense correspondence map $(\tilde{\Phi}_x, \tilde{\Phi}_y)$. For example, the interpolation method may be a scattered point set interpolation. It may be based on a natural neighbor interpolation. In addition, it may be based on interpolation on a Delaunay subdivision of the convex hull or Voronoi tessellation on the underlying points. Moreover, the extrapolation method may be based on a nearest neighbor method on the boundary of the convex hull.

FIG. 15 shows an example of a dense correspondence map with $(\tilde{\Phi}_x, \tilde{\Phi}_y)$ depicted as maps 1501 and 1502.

In step 1303, the dynamic pattern for layer $B_1$ is determined by using the dense correspondence map and a predetermined pattern for the interior pixel-layer (e.g., layer F in FIG. 10, layer $F_2$ in FIG. 5 or 6).

Figure 16:
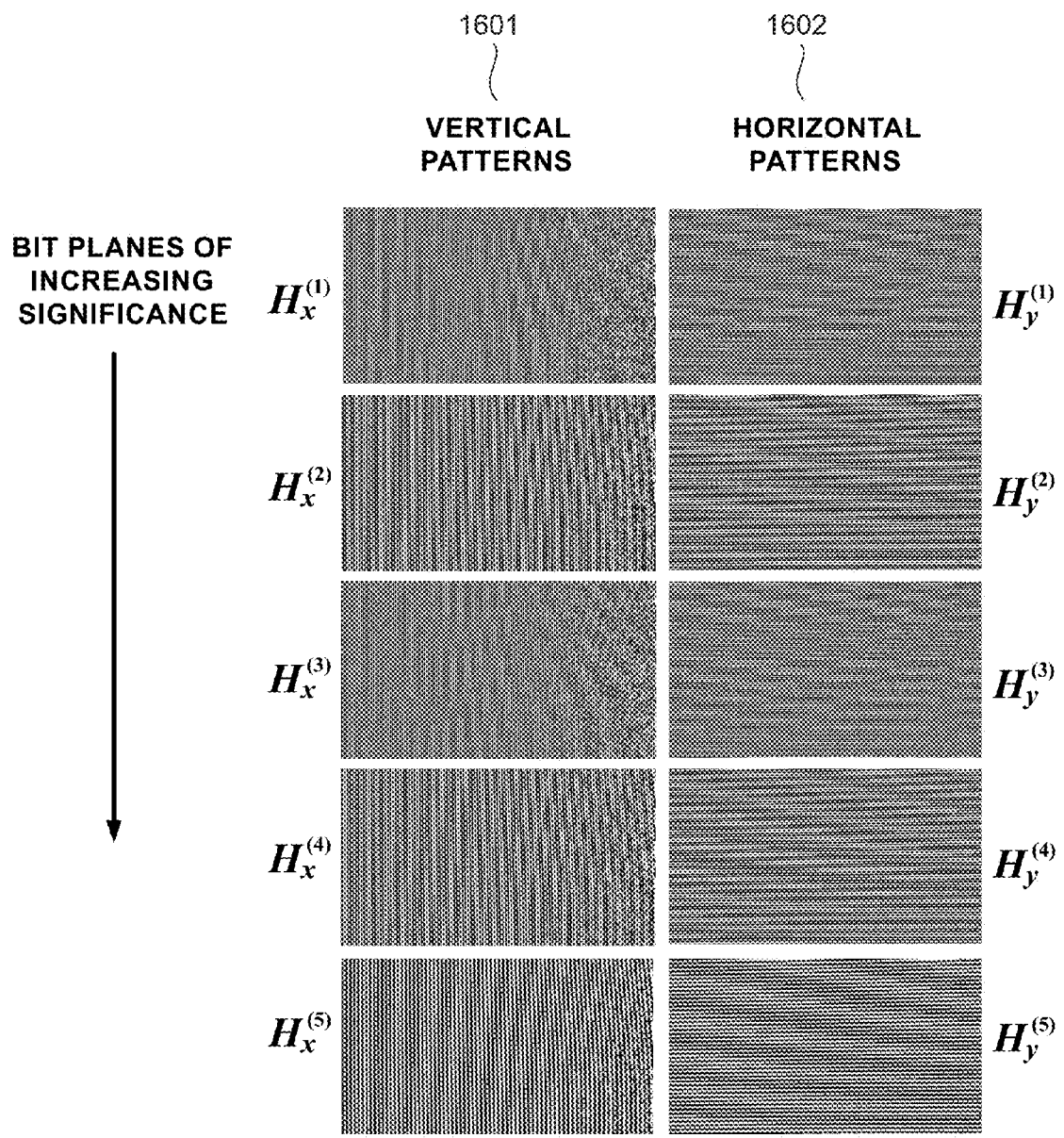
FIG. 16 is a visualization of vertical and horizontal patterns according to an example embodiment.

In particular, the dynamic patterns on $B_1$ are defined by:

$$H_x^{(k)}(i,j)=G_x^{(k)}(\tilde{\Phi}_x(i,j)-\sigma)$$

$$H_y^{(k)}(i,j)=G_y^{(k)}(\tilde{\Phi}_y(i,j)-\sigma)$$

for k=1, 2, . . . , 5 and $\sigma=2$ in one embodiment. FIG. 16 shows an example of a set of dynamic patterns, including vertical patterns 1601 and horizontal patterns 1602. These patterns are dynamic in the sense that they depend on the object being measured, and therefore must be determined "on the fly".

Once capture is complete, the reconstruction procedure for the differential method differs from the direct method.

Returning to the reconstruction process for the direct method depicted in FIG. 8, the step 802 "Decode patterns in images" is the same for non-interior pixel-layers (such as $B_1$ and $F_1$) in the differential method.

However, for an interior pixel-layer F in the differential method, the row and column index maps are decoded differently.

Concretely, for a valid camera pixel p, the estimated indices are given by $(\hat{I}_F(p), \hat{J}_F(p))$. This step of estimating the index maps during reconstruction is identical to step 902 depicted in FIG. 9 during capture.

Now binarizing the Phase II captured images results in 10 binary images $b_x^{(k)}(p), b_y^{(k)}(p)$, k=1, 2, . . . , 5:

$$b_x^{(k)}(p) \sim G_x^{(k)}(J_F(p)) \oplus H_x^{(k)}(I_{B1}(p),J_{B1}(p))=G_x^{(k)}(J_F(p)) \oplus G_x^{(k)}(\hat{J}_F(p)-\sigma)$$

$$b_y^{(k)}(p) \sim G_y^{(k)}(I_F(p)) \oplus H_y^{(k)}(I_{B1}(p),J_{B1}(p))=G_y^{(k)}(I_F(p)) \oplus G_y^{(k)}(\hat{I}_F(p)-\sigma),$$

where $\oplus$ denotes bitwise XOR (exclusive OR operator) and the right hand sides of the "~" sign are the "explanations" of the binary images, i.e., they explain how the binary images were formed. Note that $(I_F(p), J_F(p))$, the true row and column indices on layer F, are still unknown and yet to be determined.

Assuming that $|I_F(p)-\hat{I}_F(p)| \le \sigma, |J_F(p)-\hat{J}_F(p)| \le \sigma$ and using the definition of minimum run length (mrl) and the relation of the binary images to the Hamming distance, equations are obtained for recovering the true indices, i.e., the index maps for an interior pixel-layer:

$$I_F(p) = \hat{I}_F(p) + \sum_{k=1}^{5} b_y^{(k)}(p) - \sigma$$

$$J_F(p) = \hat{J}_F(p) + \sum_{k=1}^{5} b_x^{(k)}(p) - \sigma.$$

With this variation in reconstruction algorithm in step 802 of FIG. 8, the rest of the steps in FIG. 8 are performed for the differential method in exactly the same manner as the direct method. In addition, we can also use the above refined index maps to refine the sparse correspondence map, as follows.

The refined sparse correspondence map $(\Phi_x^*, \Phi_y^*)$ is defined by:

$$\Phi_x^*(i,j)=[\text{Avg}\{J_F(p)|I_{B1}(p)=i,J_{B1}(p)=j\}]$$

$$\Phi_y^*(i,j)=[\text{Avg}\{I_F(p)|I_{B1}(p)=i,J_{B1}(p)=j\}]$$

where [•] denotes the operation of rounding to the nearest integer and Avg denotes the operation of averaging the values in the set.

Thus, as described above, a depth value of an object is measured using a first illuminating step (i.e., Phase I) of illuminating the object with first and second pixel-layers of a luminaire. The luminaire comprises three or more spaced-apart pixel-layers including the first and second pixel-layers and a third pixel-layer, each pixel-layer including a rectangular array of pixels. One or more images are captured of the object illuminated with the first and second pixel-layers of the luminaire, and a preliminary pixel correspondence (i.e., the sparse correspondence map above) is estimated between pixels of the third pixel-layer and pixels of the first and second pixel-layers based on the captured images. There is a dynamic determination of a light pattern for illumination of the object by the second pixel-layer, based on the estimated preliminary pixel correspondence. A second illuminating step (i.e., Phase II) illuminates the object by the luminaire including displaying the dynamically determined light pattern on the second pixel-layer and displaying a predetermined light pattern on the third pixel-layer. Images of the object simultaneously illuminated by the second and third pixel-layers of the luminaire are captured, and the estimated preliminary pixel correspondence is refined based on the captured images. The depth value of a point on the surface of the object is determined using an illumination direction from a regression fitting based on the refined pixel correspondence (i.e., the refined sparse correspondence map above) among the three or more spaced-apart pixel-layers. The spaced-apart pixel-layers of the luminaire are grouped into at least a front group and a back group, and the front group is separated from the back group by a distance that is relatively large as compared to a distance by which the spaced-apart pixel-layers within any one group are separated.

In one embodiment, the differential method is only applied to an interior pixel-layer in the front group. This is because the correction term in the differential method is based on the assumption that the difference between the estimated index and the true index is within $\sigma$ pixels ($\sigma=2$ for 5-bit long run-length Gray code). For interior pixel-layer in the back group, the difference may exceed $\sigma$ pixels due to the higher uncertainty and the lack of resolution of the camera on the back pixel-layers, these layers being farther away from the camera.

Tables 1 and 2 below show some exemplary results of reconstructing depth and normal vectors using the direct method and the differential method for up to 5 LCD panels as embodiments of pixel-layers, where under the differential method, it is understood that only interior panels in the front group (i.e., F2 and F3) are subjected to the differential method. All errors shown are average errors and "% error reduction" is relative to the 2 LCD panel case.

3D Reconstruction Errors:

TABLE 1

| | Direct Method | | Differential Method | |
| --- | --- | --- | --- | --- |
| | Depth errors (mm) | % error reduction | Depth errors (mm) | % error reduction |
| B1, F1 | 0.1616 | N/A | N/A | N/A |
| B1, F1, F2 | 0.1310 | 19% | 0.1381 | 15% |
| B1, F1, F2, B2 | 0.1156 | 28% | 0.1270 | 21% |
| B1, F1, F2, B2, F3 | 0.1026 | 36% | 0.1161 | 28% |

Normal Vector Reconstruction Errors:

TABLE 2

| | Direct Method | | Differential Method | |
| --- | --- | --- | --- | --- |
| | Normal errors (degrees) | % error reduction | Normal errors (degrees) | % error reduction |
| B1, F1 | 0.0710 | N/A | N/A | N/A |
| B1, F1, F2 | 0.0633 | 11% | 0.0637 | 10% |
| B1, F1, F2, B2 | 0.0515 | 27% | 0.0542 | 24% |
| B1, F1, F2, B2, F3 | 0.0481 | 32% | 0.0511 | 28% |

Finally, according to this example and assuming that all LCD panels are of pixel resolution 1920×1080, Table 3 shows the number of required images.

TABLE 3

| | Direct Method | Differential Method |
| --- | --- | --- |
| B1, F1 | 88 | N/A (88) |
| B1, F1, F2 | 132 | 108 |
| B1, F1, F2, B2 | 176 | 152 |
| B1, F1, F2, B2, F3 | 220 | 172 |

In still another example embodiment, multiple luminaires are positioned at different angular positions around an inspection station at which the object is positioned, and one or more images of the object illuminated by the pixel-layers of the multiple luminaires are captured. The depth value of a point on the surface of the object is determined based on the one or more captured images.

Figure 17:
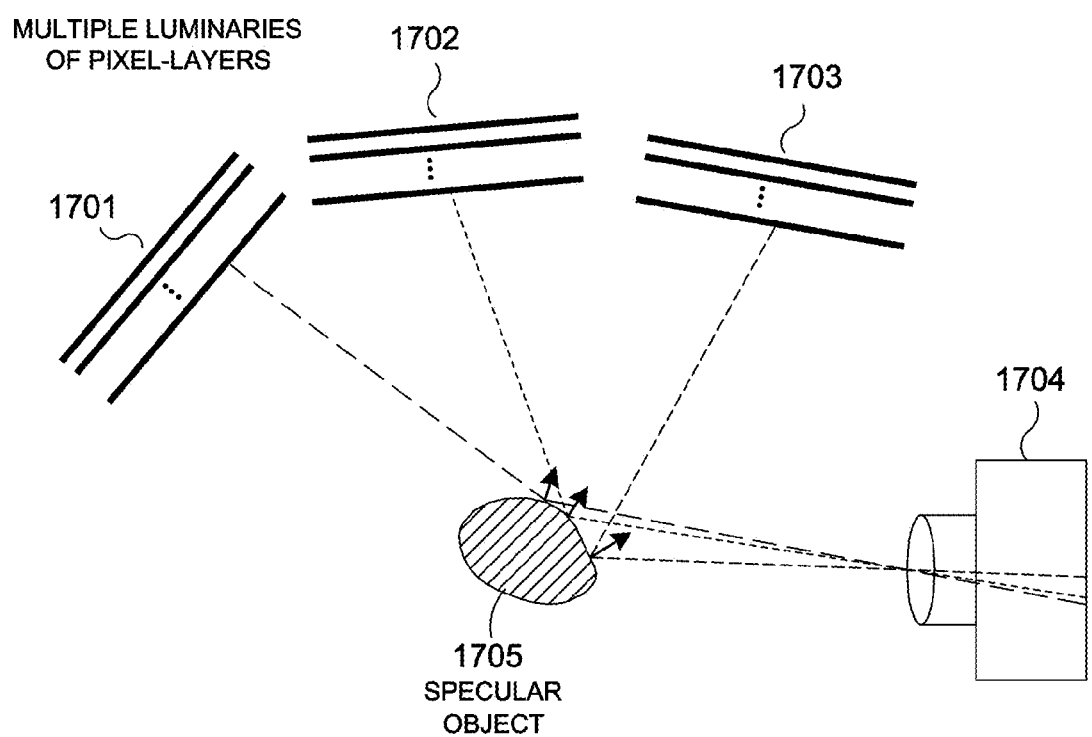
FIG. 17 is a view illustrating an arrangement for image capture according to an example embodiment.
Figure 18:
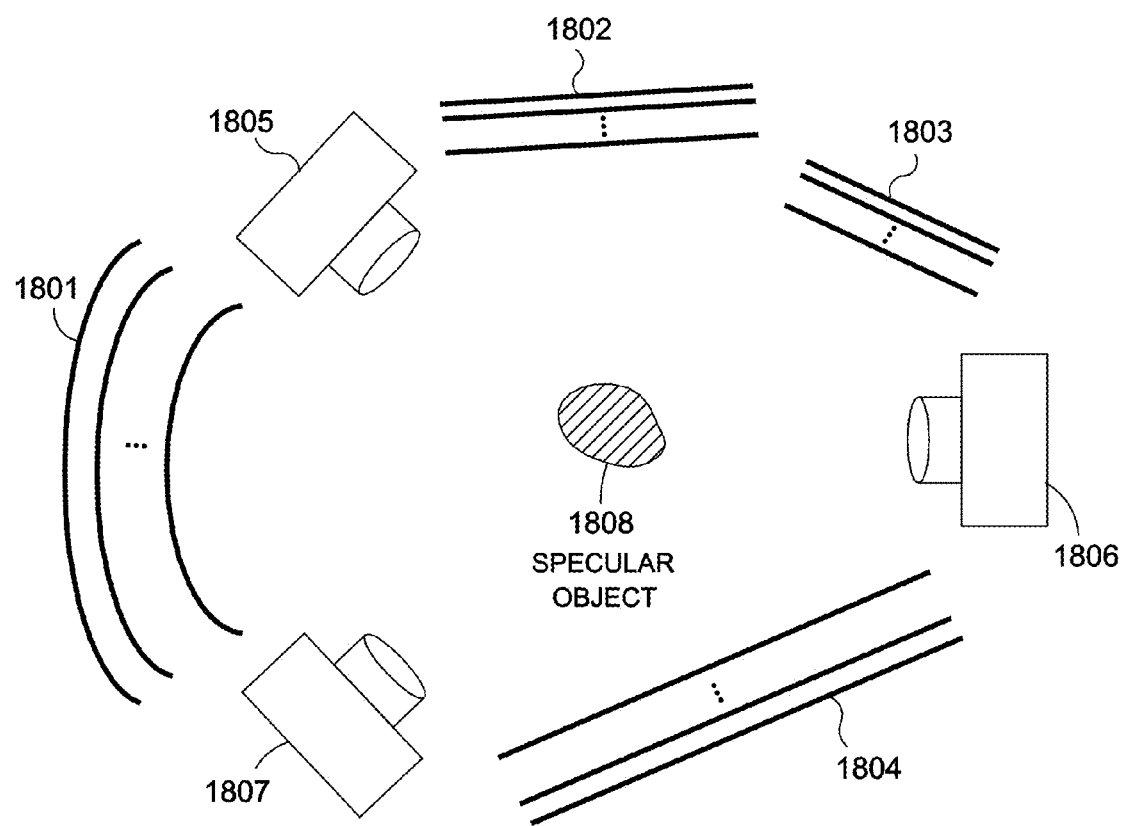
FIG. 18 is a view illustrating an arrangement for image capture according to an example embodiment.

In this regard, FIGS. 17 and 18 are views illustrating an arrangement for image capture according to such an example embodiment.

In particular, in the arrangement shown in FIG. 17, the images are captured by a single image capture device.

Thus, FIG. 17 depicts multiple luminaires each comprising pixel-layers, specifically assembly 1701, assembly 1702 and assembly 1703, along with image capture device 1704 and specular object 1705.

If the pixels of pixel-layers of the luminaire(s) have different colors, and the camera is a multispectral camera capable of capturing in different color channels, then it is possible to have multiple active pixel-layers simultaneously. There are other "in-between" scenarios, e.g., when each luminaire consists of pixel-layers with distinct colors whereas colors are not distinct between luminaires, such as the case of identical luminaires, in which case pixel-layers within a luminaire can be active simultaneously, while each luminaire becomes "active" in turn, in a temporally sequential manner.

In the arrangement shown in FIG. 18, the images are captured by multiple image capture devices positioned at different angular positions around an inspection station at which the object is positioned. Multiple cameras allow depth maps in multiple viewpoints. In one embodiment, all the cameras perform capture simultaneously.

Thus, as shown in FIG. 18, assemblies 1801, 1802, 1803, and 1804 and cameras 1805, 1806 and 1807 surround specular object 1808.

According to the above-described example embodiments, it is ordinarily possible to provide depth value measurement which benefits from angular super-resolution (i.e., illumination direction determined by regression fitting on more than two points), resulting in subpixel accuracy that is higher in resolution than the pixel resolution of each individual pixel-layer of the luminaire, as illustrated in the results shown in Tables 1 and 2.

OTHER EMBODIMENTS

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), microdrive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a non-volatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for measuring a depth value of an object, the method comprising:
    illuminating the object with a luminaire comprising at least three or more spaced-apart pixel-layers including a first pixel-layer, a second pixel-layer and a third pixel-layer, each pixel-layer including a rectangular array of pixels;
    capturing one or more images of the object illuminated by the pixel-layers of the luminaire; and
    determining the depth value of a point on the surface of the object based on the one or more captured images,
    wherein the spaced-apart pixel-layers of the luminaire are grouped into at least a front group and a back group, and wherein the front group is separated from the back group by a distance that is relatively large as compared to a distance by which the spaced-apart pixel-layers within any one group are separated.

2. The method according to claim 1, wherein there are at least as many pixel-layers in the front group as there are in the back group.

3. The method according to claim 1, wherein the object is illuminated with one or more light patterns corresponding to binary coded patterns displayed on the pixel-layers.

4. The method according to claim 3, wherein the captured images comprise images of light patterns from the luminaire as reflected by the surface of the object.

5. The method according to claim 3, wherein at least one of the binary coded patterns is based on a Gray code.

6. The method according to claim 3, wherein two of the binary coded patterns respectively displayed on two different pixel-layers are based on a long run-length Gray code.

7. The method according to claim 1, wherein pixels in one of the pixel-layers have the same dot pitch and aspect ratio as pixels in one of the other pixel-layers.

8. The method according to claim 1, wherein the depth value is determined at a resolution higher than the pixel resolution of each individual pixel-layer of the luminaire.

9. The method according to claim 1, wherein multiple luminaries are positioned at different angular positions around an inspection station at which the object is positioned, and further comprising capturing one or more images of the object illuminated by the pixel-layers of the multiple luminaires and determining the depth value of a point on the surface of the object based on the one or more captured images.

10. The method according to claim 1, wherein the images are captured by a single image capture device.

11. The method according to claim 1, wherein the images are captured by multiple image capture devices positioned at different angular positions around an inspection station at which the object is positioned.

12. A method for measuring a depth value of an object, the method comprising:
    a first illuminating step of illuminating the object with first and second pixel-layers of a luminaire, wherein the luminaire comprises three or more spaced-apart pixel-layers including the first and second pixel-layers and a third pixel-layer, each pixel-layer including a rectangular array of pixels;
    capturing one or more images of the object illuminated with the first and second pixel-layers of the luminaire;

estimating a preliminary pixel correspondence between pixels of the third pixel-layer and pixels of the first and second pixel-layers based on the captured images;

determining dynamically a light pattern for illumination of the object by the second pixel-layer, based on the estimated preliminary pixel correspondence;

a second illuminating step of illuminating the object by the luminaire including displaying the dynamically determined light pattern on the second pixel-layer and displaying a predetermined light pattern on the third pixel-layer;

capturing images of the object simultaneously illuminated by the second and third pixel-layers of the luminaire;

refining the estimated preliminary pixel correspondence based on the captured images; and determining the depth value of a point on the surface of the object using an illumination direction from a regression fitting based on the refined pixel correspondence among the three or more spaced-apart pixel-layers.

13. The method according to claim 12, wherein the third pixel-layer is between the first pixel-layer and the second pixel-layer.

14. The method according to claim 12, wherein the spaced-apart pixel-layers of the luminaire are grouped into at least a front group and a back group, and wherein the front group is separated from the back group by a distance that is relatively large as compared to a distance by which the spaced-apart pixel-layers within any one group are separated.

15. The method according to claim 14, wherein there are at least as many pixel-layers in the front group as there are in the back group.

16. The method according to claim 12, wherein the object is illuminated with one or more light patterns corresponding to binary coded patterns displayed on the pixel-layers.

17. The method according to claim 16, wherein the captured images comprise images of light patterns from the luminaire as reflected by the surface of the object.

18. The method according to claim 16, wherein in the first illuminating step, at least one of the binary coded patterns is based on a Gray code.

19. The method according to claim 16, wherein in the second illuminating step, two of the binary coded patterns respectively displayed on two different pixel-layers are based on a long run-length Gray code.

20. The method according to claim 12, wherein pixels in one of the pixel-layers have the same dot pitch and aspect ratio as pixels in one of the other pixel-layers.

21. The method according to claim 12, wherein the depth value is determined at a resolution higher than the pixel resolution of each individual pixel-layer of the luminaire.

22. The method according to claim 12, wherein multiple luminaries are positioned at different angular positions around an inspection station at which the object is positioned, and further comprising capturing one or more images of the object illuminated by the pixel-layers of the multiple luminaires and determining the depth value of a point on the surface of the object based on the one or more captured images.

23. The method according to claim 12, wherein the images are captured by a single image capture device.

24. The method according to claim 12, wherein the images are captured by multiple image capture devices positioned at different angular positions around an inspection station at which the object is positioned.

* * * * *